US011641640B2

(12) United States Patent
Zorgui et al.

(10) Patent No.: US 11,641,640 B2
(45) Date of Patent: May 2, 2023

(54) SIDELINK-ASSISTED POSITION ESTIMATION PROCEDURE

(71) Applicant: QUALCOMM Incorporated, San Diego, CA (US)

(72) Inventors: Marwen Zorgui, San Diego, CA (US); Srinivas Yerramalli, Hyderabad (IN); Xiaoxia Zhang, San Diego, CA (US); Piyush Gupta, Bridgewater, NJ (US); Rajat Prakash, San Diego, CA (US); Junyi Li, Fairless Hills, PA (US); Xiaojie Wang, Hillsborough, NJ (US); Mohammad Tarek Fahim, Tucson, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/387,844

(22) Filed: Jul. 28, 2021

(65) Prior Publication Data
US 2023/0034433 A1    Feb. 2, 2023

(51) Int. Cl.
*H04W 72/02*    (2009.01)
*H04L 5/00*    (2006.01)
(Continued)

(52) U.S. Cl.
CPC ........... *H04W 72/02* (2013.01); *H04L 5/0051* (2013.01); *H04W 24/10* (2013.01); *H04W 72/51* (2023.01); *H04W 92/18* (2013.01)

(58) Field of Classification Search
CPC ....... H04W 4/40; H04W 12/63; H04W 76/28; H04W 48/04
See application file for complete search history.

(56) References Cited

U.S. PATENT DOCUMENTS 9,332,389 B1    5/2016 De Lorenzo et al.
2016/0095080 A1    3/2016 Khoryaev et al.
(Continued)

FOREIGN PATENT DOCUMENTS

EP    3280172 A  *  2/2018
WO    2021030583 A1    2/2021

OTHER PUBLICATIONS

Q. Yang, C. Jiang and F. Bi, "Joint Wireless Positioning by Base Stations and Road Side Units for 5G Advanced," 2022 IEEE International Conference on Communications Workshops (ICC Workshops), 2022, pp. 1-5, doi: 10.1109/ICCWorkshops53468.2022. 9882157. (Year: 2022).*

(Continued)

*Primary Examiner* — William D Cumming
(74) *Attorney, Agent, or Firm* — Thien T. Nguyen

(57) ABSTRACT

Techniques for location determination of user equipment (UE) are provided. In an aspect, a position estimation entity (e.g., UE, gNB, LMF, etc.) identifies a pool of UEs for a SL-assisted position estimation procedure of a set of target UEs. SL SRS-Ps are communicated (e.g., transmitted and measured) between the pool of UEs (e.g., for relative SL ranging). UL SRS-Ps are communicated by at least some of the UEs in the pool of UEs. The position estimation entity obtains measurement data for both the SL SRS-P and UL-SRS-P communications. The position estimation entity determines a position estimate for each UE in the set of UEs based on the measurement information.

28 Claims, 19 Drawing Sheets

(51) Int. Cl.
    *H04W 24/10*     (2009.01)
    *H04W 72/51*     (2023.01)
    *H04W 92/18*     (2009.01)

(56) References Cited

U.S. PATENT DOCUMENTS

| | | | |
|---|---|---|---|
| 2021/0219103 A1 | 7/2021 | Wang et al. | |
| 2022/0232660 A1* | 7/2022 | Back | H04W 76/28 |
| 2022/0272487 A1* | 8/2022 | Choi | G01S 5/0284 |
| 2022/0353718 A1* | 11/2022 | Duan | H04W 48/04 |

OTHER PUBLICATIONS

R. Keating, M. Säily, J. Hulkkonen and J. Karjalainen, "Overview of Positioning in 5G New Radio," 2019 16th International Symposium on Wireless Communication Systems (ISWCS), Oulu, Finland, 2019, pp. 320-324, doi: 10.1109/ISWCS.2019.8877160. (Year: 2019).*

International Search Report and Written Opinion—PCT/US2022/072686—ISA/EPO—Sep. 30, 2022.

* cited by examiner

SIDELINK-ASSISTED POSITION ESTIMATION PROCEDURE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a position estimation entity includes identifying a pool of user equipments (UEs) for a sidelink (SL)-assisted position estimation procedure of a set of target UEs; determining a first resource configuration for the SL-assisted position estimation procedure, the first resource configuration including a first set of resources associated with communication of at least one SL sounding reference signal for positioning (SRS-P) between some or all of the pool of UEs; determining a second resource configuration for the SL-assisted position estimation procedure, the second resource configuration including a second set of resources associated with transmission of uplink (UL) SRS-P by at least one UE in the pool of UEs; transmitting a first indication of the first resource configuration to the pool of UEs; transmitting a second indication of the second resource configuration to the at least one UE; receiving first measurement information based on measurements of the at least one SL SRS-P in accordance with the first resource configuration; receiving second measurement information based on measurements of the at least one UL SRS-P in accordance with the second resource configuration; and determining a position estimate for each UE in the set of UEs based on the first measurement information and the second measurement information.

In some aspects, each UE in the pool of UEs has an established SL connection to each other UE in the pool of UEs with which a respective SL SRS-P is to be communicated in accordance with the first resource configuration prior to the transmission of the first indication.

In some aspects, one or more SL connections between UEs in the pool of UEs are setup in conjunction with the SL-assisted position estimation procedure.

In some aspects, the first set of resources precedes the second set of resources such that the at least one SL SRS-P is communicated before transmission of the at least one UL SRS-P.

In some aspects, the method includes selecting the at least one UE in the pool of UEs for transmission of the at least one UL SRS-P based in part upon the first measurement information.

In some aspects, the selection is based upon an overhead parameter, an accuracy parameter, a UE capability parameter, a power parameter, a quality parameter, a geographic parameter, or a combination thereof.

In some aspects, the second set of resources precedes the first set of resources such that the at least one transmission of the UL SRS-P occurs before the at least one SL SRS-P is communicated.

In some aspects, the method includes determining to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

In some aspects, the method includes transmitting indications of the determined position estimates.

In some aspects, the indications of the determined position estimates are transmitted individually to each of the set of target UEs, or at least one of the indications of the determined position estimates is transmitted to a lead UE for forwarding to a respective target UE.

In some aspects, one or more UEs in the pool of UEs is not part of the set of target UEs.

In some aspects, the one or more UEs correspond to anchor UEs associated with one or more known position estimates.

In some aspects, the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

In some aspects, the position estimation entity corresponds to a UE among the pool of UEs or a network component.

In some aspects, the first measurement data is received via individual reports from a plurality of UEs in the pool of UEs that measure the at least one SL SRS-P, or some or all of the first measurement data as measured by the plurality of UEs is received via a lead UE of the pool of UEs.

In an aspect, a method of operating a user equipment (UE) includes receiving a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; receiving a second indication of a second resource configuration for the SL-assisted position estimation procedure, the second resource configuration including a second set of resources associated with transmission of uplink (UL) SRS-P by the UE; transmitting a first SL SRS-P to one or more other UEs in the pool of UEs, measuring a second SL SRS-P from another UE in the pool of UEs, or both, in accordance with the first resource configuration; and transmitting the UL SRS-P in accordance with the second resource configuration.

In some aspects, the UE is among the set of target UEs, further comprising: receiving a position estimate of the UE associated with the SL-assisted position estimation procedure.

In some aspects, the position estimate is received from a position estimation entity or from another UE among the pool of UEs.

In some aspects, the UE has an established SL connection to each of the one or more other UEs in the pool of UEs prior to the reception of the first indication.

In some aspects, one or more SL connections between the UE and the one or more other UEs in the pool of UEs are setup in conjunction with the SL-assisted position estimation procedure.

In some aspects, the first set of resources precedes the second set of resources such that the at least one SL SRS-P is communicated before the transmission of the UL SRS-P.

In some aspects, the second set of resources precedes the first set of resources such that the transmission of the UL SRS-P occurs before the at least one SL SRS-P is communicated.

In some aspects, the UE in the pool of UEs is not part of the set of target UEs.

In some aspects, the UE corresponds to an anchor UEs associated with a known position estimate.

In some aspects, the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

In some aspects, the UE measures the second SL SRS-P from the another UE, further comprising: transmitting measurement data based on the measurement of the second SL SRS-P directly to a position estimation entity or to a lead UE of the pool of UEs.

In an aspect, a position estimation entity includes a memory; at least one transceiver; and at least one processor communicatively coupled to the memory and the at least one transceiver, the at least one processor configured to: identify a pool of user equipments (UEs) for a sidelink (SL)-assisted position estimation procedure of a set of target UEs; determine a first resource configuration for the SL-assisted position estimation procedure, the first resource configuration including a first set of resources associated with communication of at least one SL sounding reference signal for positioning (SRS-P) between some or all of the pool of UEs; determine a second resource configuration for the SL-assisted position estimation procedure, the second resource configuration including a second set of resources associated with transmission of uplink (UL) SRS-P by at least one UE in the pool of UEs; transmit, via the at least one transceiver, a first indication of the first resource configuration to the pool of UEs; transmit, via the at least one transceiver, a second indication of the second resource configuration to the at least one UE; receive, via the at least one transceiver, first measurement information based on measurements of the at least one SL SRS-P in accordance with the first resource configuration; receive, via the at least one transceiver, second measurement information based on measurements of the at least one UL SRS-P in accordance with the second resource configuration; and determine a position estimate for each UE in the set of UEs based on the first measurement information and the second measurement information.

In some aspects, each UE in the pool of UEs has an established SL connection to each other UE in the pool of UEs with which a respective SL SRS-P is to be communicated in accordance with the first resource configuration prior to the transmission of the first indication.

In some aspects, one or more SL connections between UEs in the pool of UEs are setup in conjunction with the SL-assisted position estimation procedure.

In some aspects, the first set of resources precedes the second set of resources such that the at least one SL SRS-P is communicated before transmission of the at least one UL SRS-P.

In some aspects, the at least one processor is further configured to: select the at least one UE in the pool of UEs for transmission of the at least one UL SRS-P based in part upon the first measurement information.

In some aspects, the selection is based upon an overhead parameter, an accuracy parameter, a UE capability parameter, a power parameter, a quality parameter, a geographic parameter, or a combination thereof.

In some aspects, the second set of resources precedes the first set of resources such that the at least one transmission of the UL SRS-P occurs before the at least one SL SRS-P is communicated.

In some aspects, the at least one processor is further configured to: determine to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

In some aspects, the at least one processor is further configured to: transmit, via the at least one transceiver, indications of the determined position estimates.

In some aspects, the indications of the determined position estimates are transmitted individually to each of the set of target UEs, or at least one of the indications of the determined position estimates is transmitted to a lead UE for forwarding to a respective target UE.

In some aspects, one or more UEs in the pool of UEs is not part of the set of target UEs.

In some aspects, the one or more UEs correspond to anchor UEs associated with one or more known position estimates.

In some aspects, the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

In some aspects, the position estimation entity corresponds to a UE among the pool of UEs or a network component.

In some aspects, the first measurement data is received via individual reports from a plurality of UEs in the pool of UEs that measure the at least one SL SRS-P, or some or all of the first measurement data as measured by the plurality of UEs is received via a lead UE of the pool of UEs.

In an aspect, a user equipment (UE) includes a memory; at least one transceiver; and at least one processor communicatively coupled to the memory and the at least one transceiver, the at least one processor configured to: receive, via the at least one transceiver, a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; receive, via the at least one transceiver, a second indication of a second resource configuration for the SL-assisted position estimation procedure, the second resource configuration including a second set of resources associated with transmission of uplink (UL) SRS-P by the UE; transmit, via the at least one transceiver, a first SL SRS-P to one or more other UEs in the pool of UEs, measuring a second SL SRS-P from another UE in the pool of UEs, or both, in accordance with the first resource configuration; and transmit, via the at least one transceiver, the UL SRS-P in accordance with the second resource configuration.

In some aspects, the UE is among the set of target UEs, further comprising: wherein the at least one processor is further configured to receive, via the at least one transceiver, a position estimate of the UE associated with the SL-assisted position estimation procedure.

In some aspects, the position estimate is received from a position estimation entity or from another UE among the pool of UEs.

In some aspects, the UE has an established SL connection to each of the one or more other UEs in the pool of UEs prior to the reception of the first indication.

In some aspects, one or more SL connections between the UE and the one or more other UEs in the pool of UEs are setup in conjunction with the SL-assisted position estimation procedure.

In some aspects, the first set of resources precedes the second set of resources such that the at least one SL SRS-P is communicated before the transmission of the UL SRS-P.

In some aspects, the second set of resources precedes the first set of resources such that the transmission of the UL SRS-P occurs before the at least one SL SRS-P is communicated.

In some aspects, the UE in the pool of UEs is not part of the set of target UEs.

In some aspects, the UE corresponds to an anchor UEs associated with a known position estimate.

In some aspects, the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

In some aspects, the UE measures the second SL SRS-P from the another UE, and the at least one processor is further configured to transmit, via the at least one transceiver, measurement data based on the measurement of the second SL SRS-P directly to a position estimation entity or to a lead UE of the pool of UEs.

In an aspect, a position estimation entity includes means for identifying a pool of user equipments (UEs) for a sidelink (SL)-assisted position estimation procedure of a set of target UEs; means for determining a first resource configuration for the SL-assisted position estimation procedure, the first resource configuration including a first set of resources associated with communication of at least one SL sounding reference signal for positioning (SRS-P) between some or all of the pool of UEs; means for determining a second resource configuration for the SL-assisted position estimation procedure, the second resource configuration including a second set of resources associated with transmission of uplink (UL) SRS-P by at least one UE in the pool of UEs; means for transmitting a first indication of the first resource configuration to the pool of UEs; means for transmitting a second indication of the second resource configuration to the at least one UE; means for receiving first measurement information based on measurements of the at least one SL SRS-P in accordance with the first resource configuration; means for receiving second measurement information based on measurements of the at least one UL SRS-P in accordance with the second resource configuration; and means for determining a position estimate for each UE in the set of UEs based on the first measurement information and the second measurement information.

In some aspects, each UE in the pool of UEs has an established SL connection to each other UE in the pool of UEs with which a respective SL SRS-P is to be communicated in accordance with the first resource configuration prior to the transmission of the first indication.

In some aspects, one or more SL connections between UEs in the pool of UEs are setup in conjunction with the SL-assisted position estimation procedure.

In some aspects, the first set of resources precedes the second set of resources such that the at least one SL SRS-P is communicated before transmission of the at least one UL SRS-P.

In some aspects, the method includes means for selecting the at least one UE in the pool of UEs for transmission of the at least one UL SRS-P based in part upon the first measurement information.

In some aspects, the selection is based upon an overhead parameter, an accuracy parameter, a UE capability parameter, a power parameter, a quality parameter, a geographic parameter, or a combination thereof.

In some aspects, the second set of resources precedes the first set of resources such that the at least one transmission of the UL SRS-P occurs before the at least one SL SRS-P is communicated.

In some aspects, the method includes means for determining to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

In some aspects, the method includes means for transmitting indications of the determined position estimates.

In some aspects, the indications of the determined position estimates are transmitted individually to each of the set of target UEs, or at least one of the indications of the determined position estimates is transmitted to a lead UE for forwarding to a respective target UE.

In some aspects, one or more UEs in the pool of UEs is not part of the set of target UEs.

In some aspects, the one or more UEs correspond to anchor UEs associated with one or more known position estimates.

In some aspects, the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

In some aspects, the position estimation entity corresponds to a UE among the pool of UEs or a network component.

In some aspects, the first measurement data is received via individual reports from a plurality of UEs in the pool of UEs that measure the at least one SL SRS-P, or some or all of the first measurement data as measured by the plurality of UEs is received via a lead UE of the pool of UEs.

In an aspect, a user equipment (UE) includes means for receiving a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; means for receiving a second indication of a second resource configuration for the SL-assisted position estimation procedure, the second resource configuration including a second set of resources associated with transmission of uplink (UL) SRS-P by the UE; means for transmitting a first SL SRS-P to one or more other UEs in the pool of UEs, measuring a second SL SRS-P from another UE in the pool of UEs, or both, in accordance with the first resource configuration; and means for transmitting the UL SRS-P in accordance with the second resource configuration.

In some aspects, the UE is among the set of target UEs, further comprising: means for receiving a position estimate of the UE associated with the SL-assisted position estimation procedure.

In some aspects, the position estimate is received from a position estimation entity or from another UE among the pool of UEs.

In some aspects, the UE has an established SL connection to each of the one or more other UEs in the pool of UEs prior to the reception of the first indication.

In some aspects, one or more SL connections between the UE and the one or more other UEs in the pool of UEs are setup in conjunction with the SL-assisted position estimation procedure.

In some aspects, the first set of resources precedes the second set of resources such that the at least one SL SRS-P is communicated before the transmission of the UL SRS-P.

In some aspects, the second set of resources precedes the first set of resources such that the transmission of the UL SRS-P occurs before the at least one SL SRS-P is communicated.

In some aspects, the UE in the pool of UEs is not part of the set of target UEs.

In some aspects, the UE corresponds to an anchor UEs associated with a known position estimate.

In some aspects, the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

In some aspects, the UE measures the second SL SRS-P from the another UE, further comprising: means for transmitting measurement data based on the measurement of the second SL SRS-P directly to a position estimation entity or to a lead UE of the pool of UEs.

In an aspect, a non-transitory computer-readable medium storing computer-executable instructions that, when executed by a position estimation entity, cause the position estimation entity to: identify a pool of user equipments (UEs) for a sidelink (SL)-assisted position estimation procedure of a set of target UEs; determine a first resource configuration for the SL-assisted position estimation procedure, the first resource configuration including a first set of resources associated with communication of at least one SL sounding reference signal for positioning (SRS-P) between some or all of the pool of UEs; determine a second resource configuration for the SL-assisted position estimation procedure, the second resource configuration including a second set of resources associated with transmission of uplink (UL) SRS-P by at least one UE in the pool of UEs; transmit a first indication of the first resource configuration to the pool of UEs; transmit a second indication of the second resource configuration to the at least one UE; receive first measurement information based on measurements of the at least one SL SRS-P in accordance with the first resource configuration; receive second measurement information based on measurements of the at least one UL SRS-P in accordance with the second resource configuration; and determine a position estimate for each UE in the set of UEs based on the first measurement information and the second measurement information.

In some aspects, each UE in the pool of UEs has an established SL connection to each other UE in the pool of UEs with which a respective SL SRS-P is to be communicated in accordance with the first resource configuration prior to the transmission of the first indication.

In some aspects, one or more SL connections between UEs in the pool of UEs are setup in conjunction with the SL-assisted position estimation procedure.

In some aspects, the first set of resources precedes the second set of resources such that the at least one SL SRS-P is communicated before transmission of the at least one UL SRS-P.

In some aspects, instructions that, when executed by position estimation entity, further cause the position estimation entity to:

In some aspects, the selection is based upon an overhead parameter, an accuracy parameter, a UE capability parameter, a power parameter, a quality parameter, a geographic parameter, or a combination thereof.

In some aspects, the second set of resources precedes the first set of resources such that the at least one transmission of the UL SRS-P occurs before the at least one SL SRS-P is communicated.

In some aspects, instructions that, when executed by position estimation entity, further cause the position estimation entity to:

In some aspects, instructions that, when executed by position estimation entity, further cause the position estimation entity to:

In some aspects, the indications of the determined position estimates are transmitted individually to each of the set of target UEs, or at least one of the indications of the determined position estimates is transmitted to a lead UE for forwarding to a respective target UE.

In some aspects, one or more UEs in the pool of UEs is not part of the set of target UEs.

In some aspects, the one or more UEs correspond to anchor UEs associated with one or more known position estimates.

In some aspects, the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

In some aspects, the position estimation entity corresponds to a UE among the pool of UEs or a network component.

In some aspects, the first measurement data is received via individual reports from a plurality of UEs in the pool of UEs that measure the at least one SL SRS-P, or some or all of the first measurement data as measured by the plurality of UEs is received via a lead UE of the pool of UEs.

In an aspect, a non-transitory computer-readable medium storing computer-executable instructions that, when executed by a user equipment (UE), cause the UE to: receive a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; receive a second indication of a second resource configuration for the SL-assisted position estimation procedure, the second resource configuration including a second set of resources associated with transmission of uplink (UL) SRS-P by the UE; transmit a first SL SRS-P to one or more other UEs in the pool of UEs, measuring a second SL SRS-P from another UE in the pool of UEs, or both, in accordance with the first resource configuration; and transmit the UL SRS-P in accordance with the second resource configuration.

In some aspects, the UE is among the set of target UEs, wherein the instructions further cause the UE to receive a position estimate of the UE associated with the SL-assisted position estimation procedure.

In some aspects, the position estimate is received from a position estimation entity or from another UE among the pool of UEs.

In some aspects, the UE has an established SL connection to each of the one or more other UEs in the pool of UEs prior to the reception of the first indication.

In some aspects, one or more SL connections between the UE and the one or more other UEs in the pool of UEs are setup in conjunction with the SL-assisted position estimation procedure.

In some aspects, the first set of resources precedes the second set of resources such that the at least one SL SRS-P is communicated before the transmission of the UL SRS-P.

In some aspects, the second set of resources precedes the first set of resources such that the transmission of the UL SRS-P occurs before the at least one SL SRS-P is communicated.

In some aspects, the UE in the pool of UEs is not part of the set of target UEs.

In some aspects, the UE corresponds to an anchor UEs associated with a known position estimate.

In some aspects, the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

In some aspects, the UE measures the second SL SRS-P from the another UE, further comprising: wherein the instructions further cause the UE to transmit measurement data based on the measurement of the second SL SRS-P directly to a position estimation entity or to a lead UE of the pool of UEs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
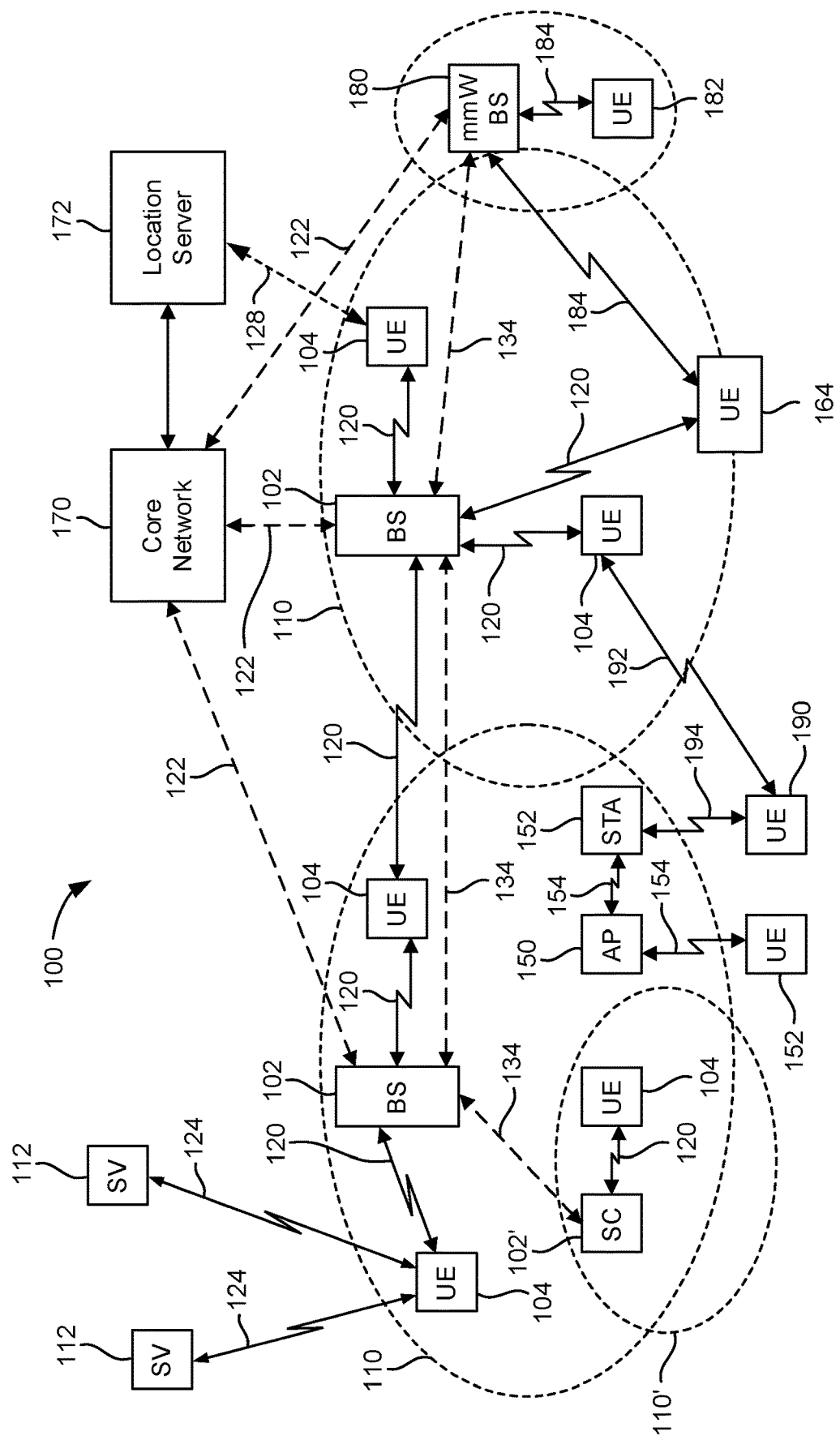
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
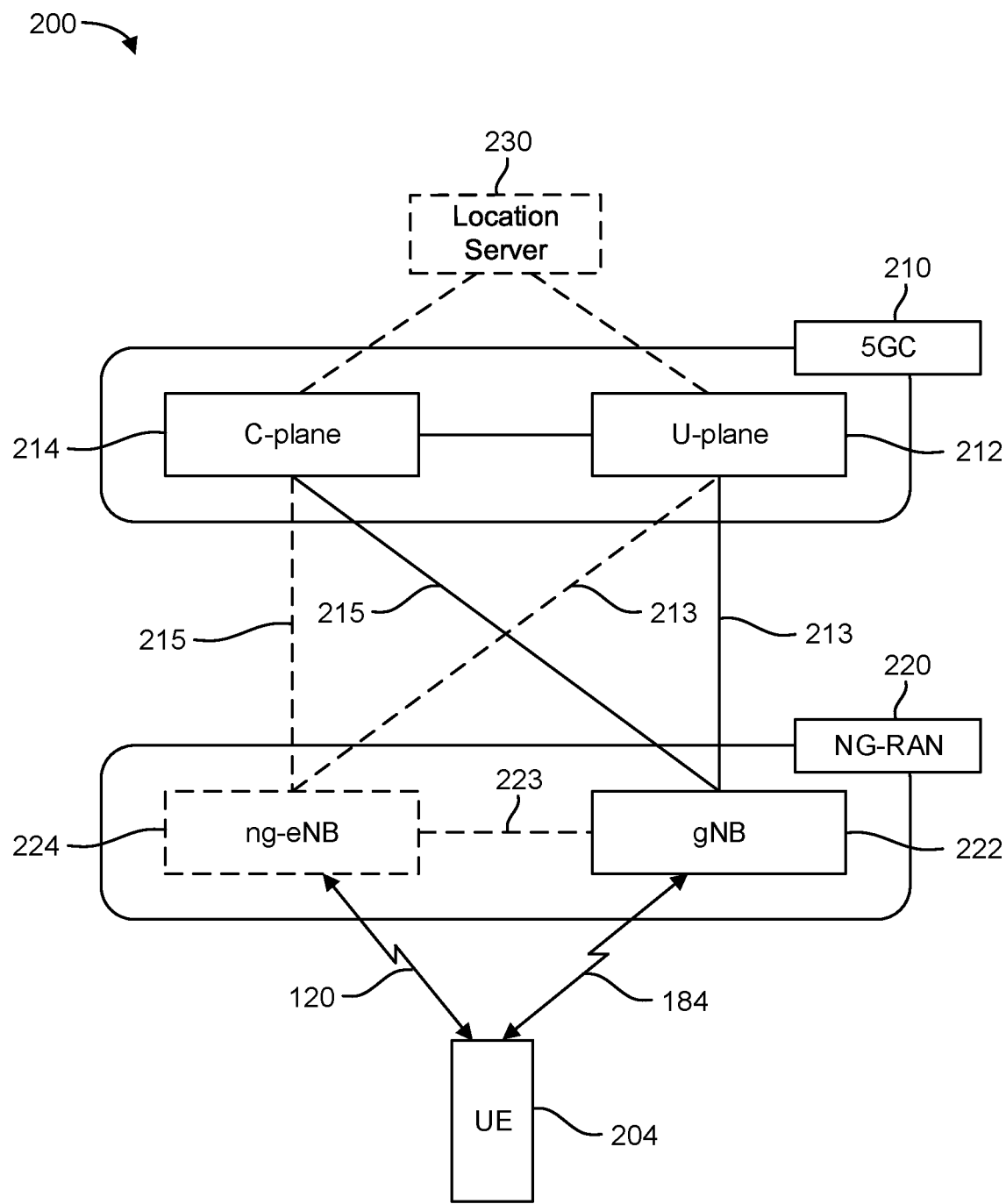
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
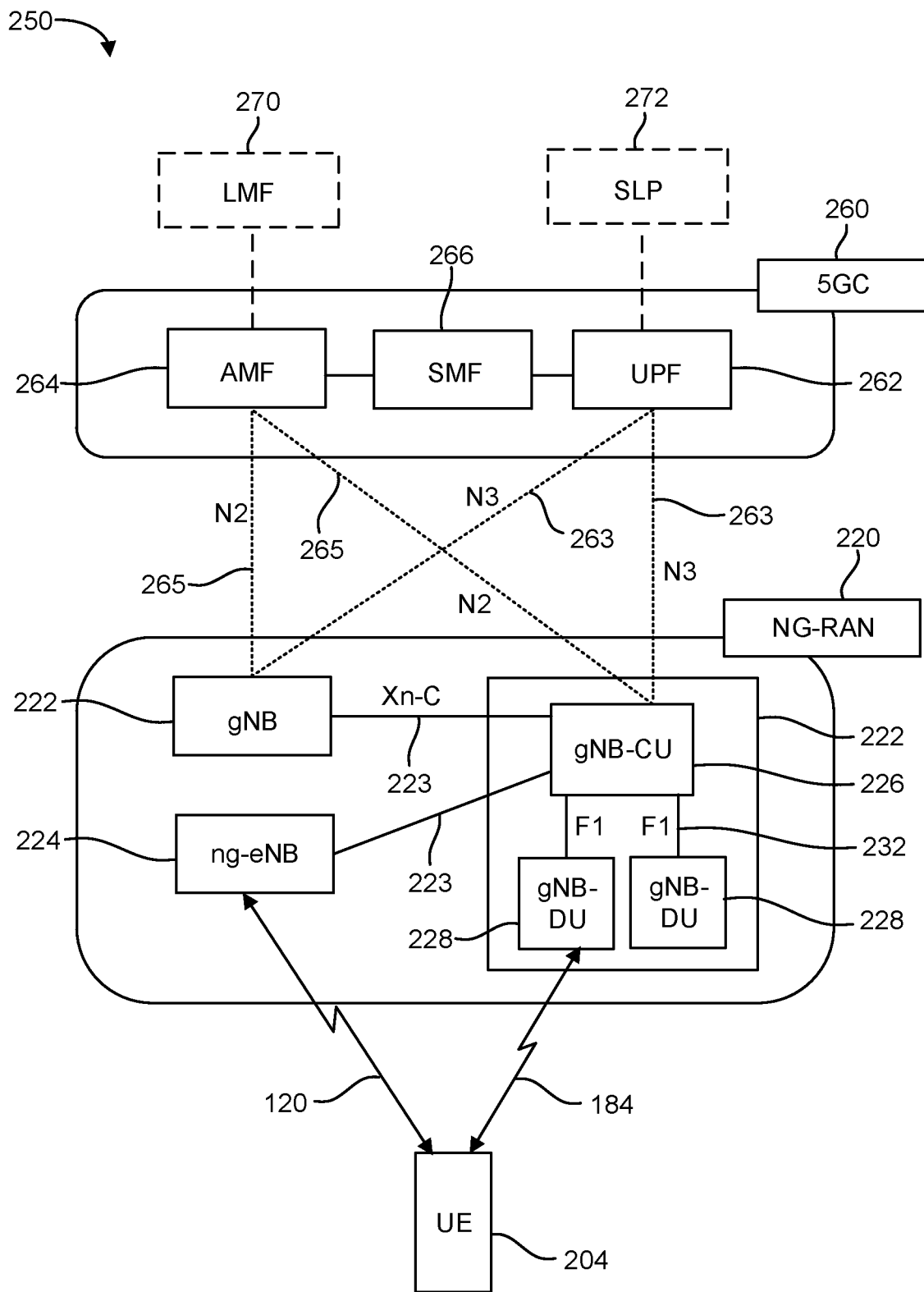

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
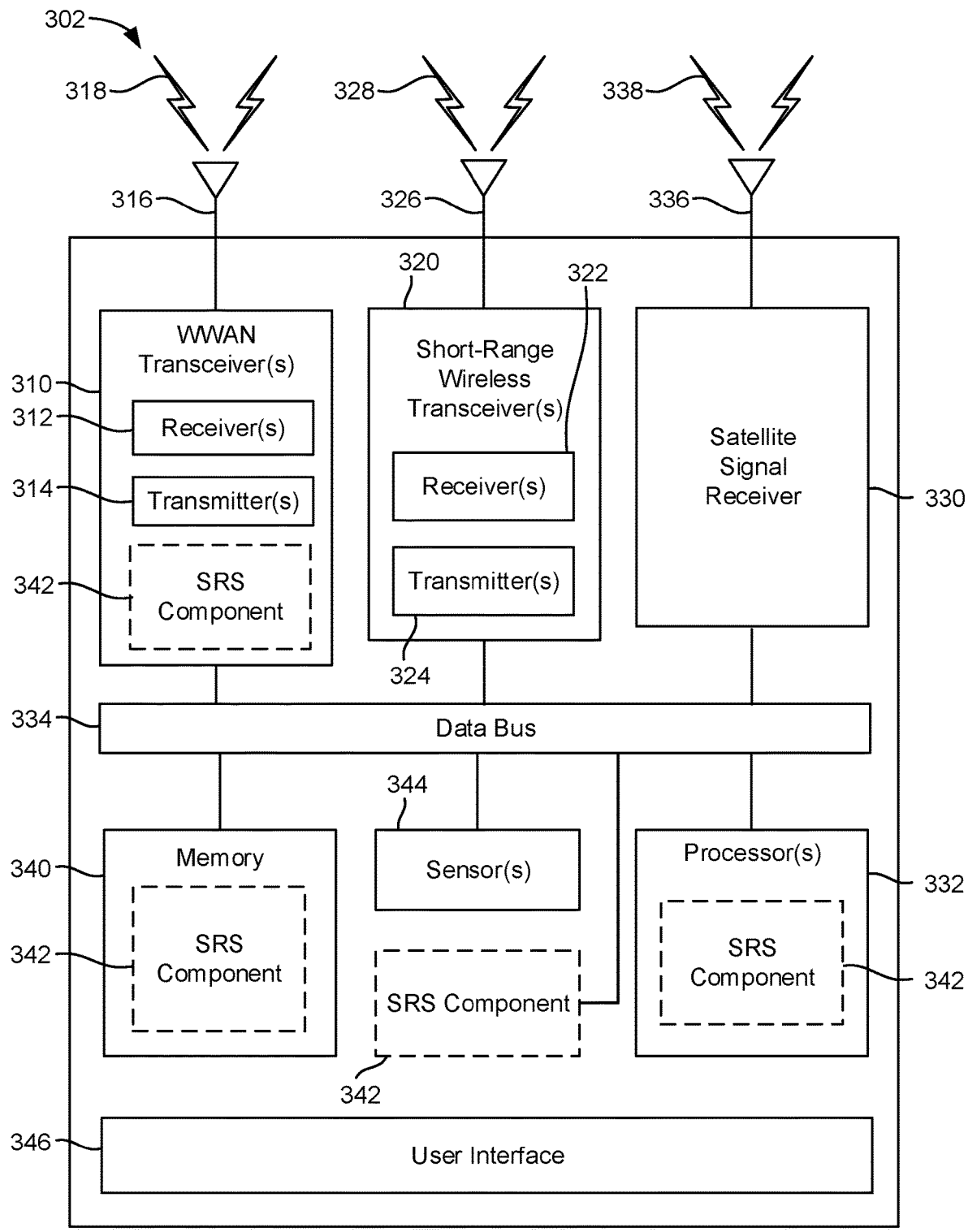
FIGS. 3A, 3B, and 3C are simplified block diagrams of several sample aspects of components that may be employed in a user equipment (UE), a base station, and a network entity, respectively, and configured to support communications as taught herein.
Figure 3B:
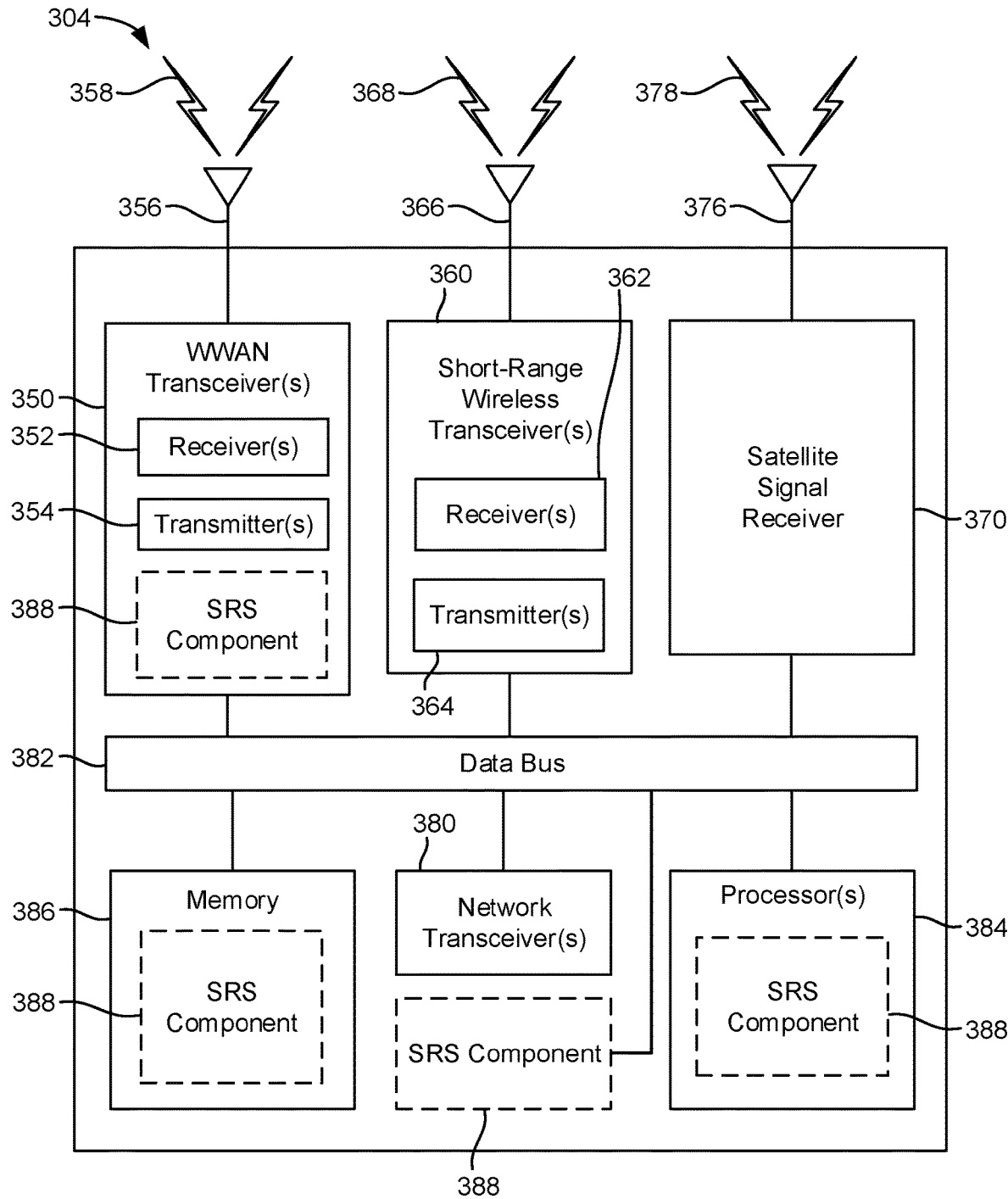
Figure 3C:
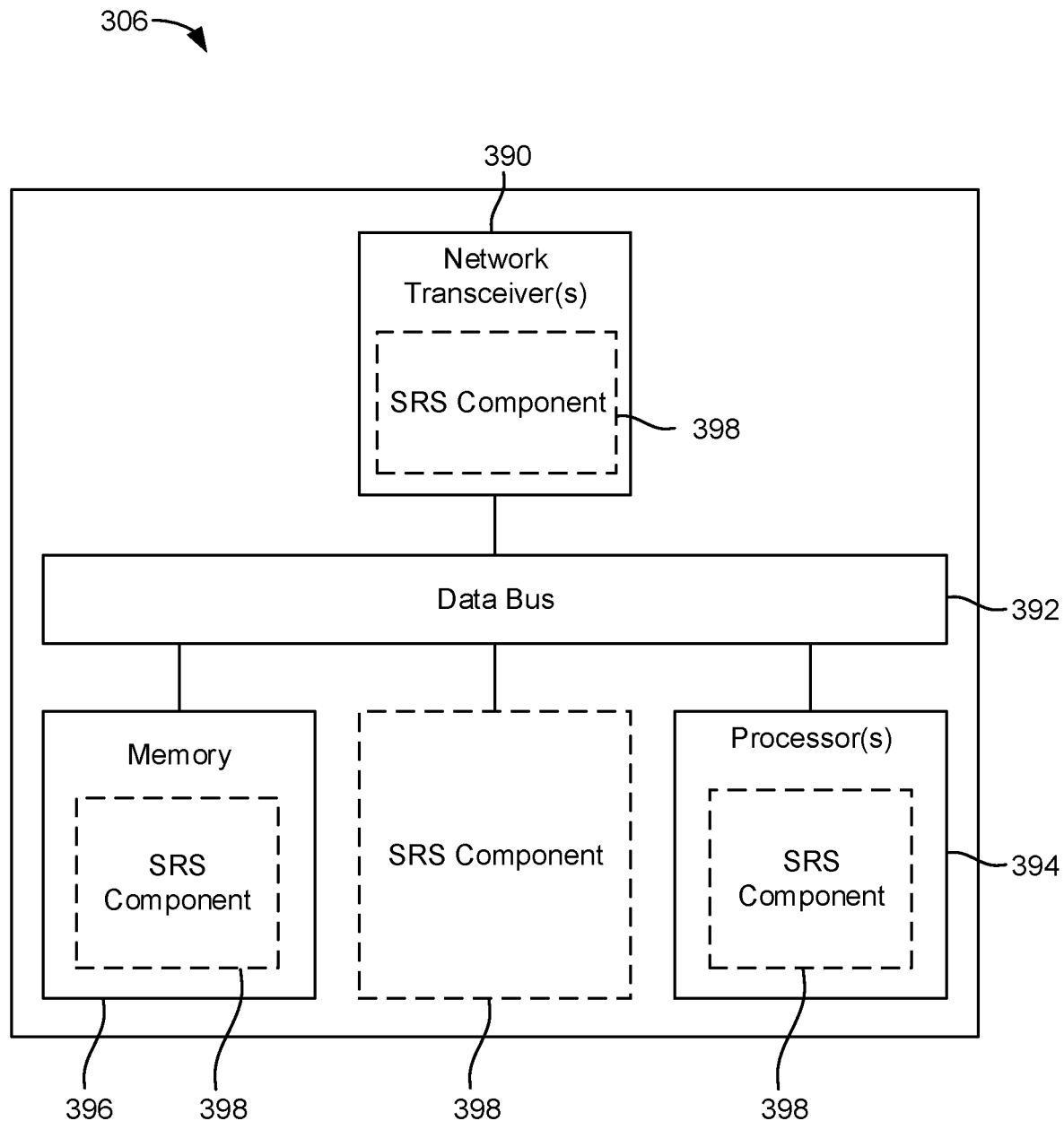

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-onchip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include SRS component 342, 388, and 398, respectively. The SRS component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the SRS component 342, 388, and 398 may be external to the processors 332, 384, and 394 (e.g., part of a modem processing system, integrated with another processing system, etc.). Alternatively, the SRS component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the SRS component 342, which may be, for example, part of the one or more WWAN transceivers 310, the memory 340, the one or more processors 332, or any combination thereof, or may be a standalone component. FIG. 3B illustrates possible locations of the SRS component 388, which may be, for example, part of the one or more WWAN transceivers 350, the memory 386, the one or more processors 384, or any combination thereof, or may be a standalone component. FIG. 3C illustrates possible locations of the SRS component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the SRS component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
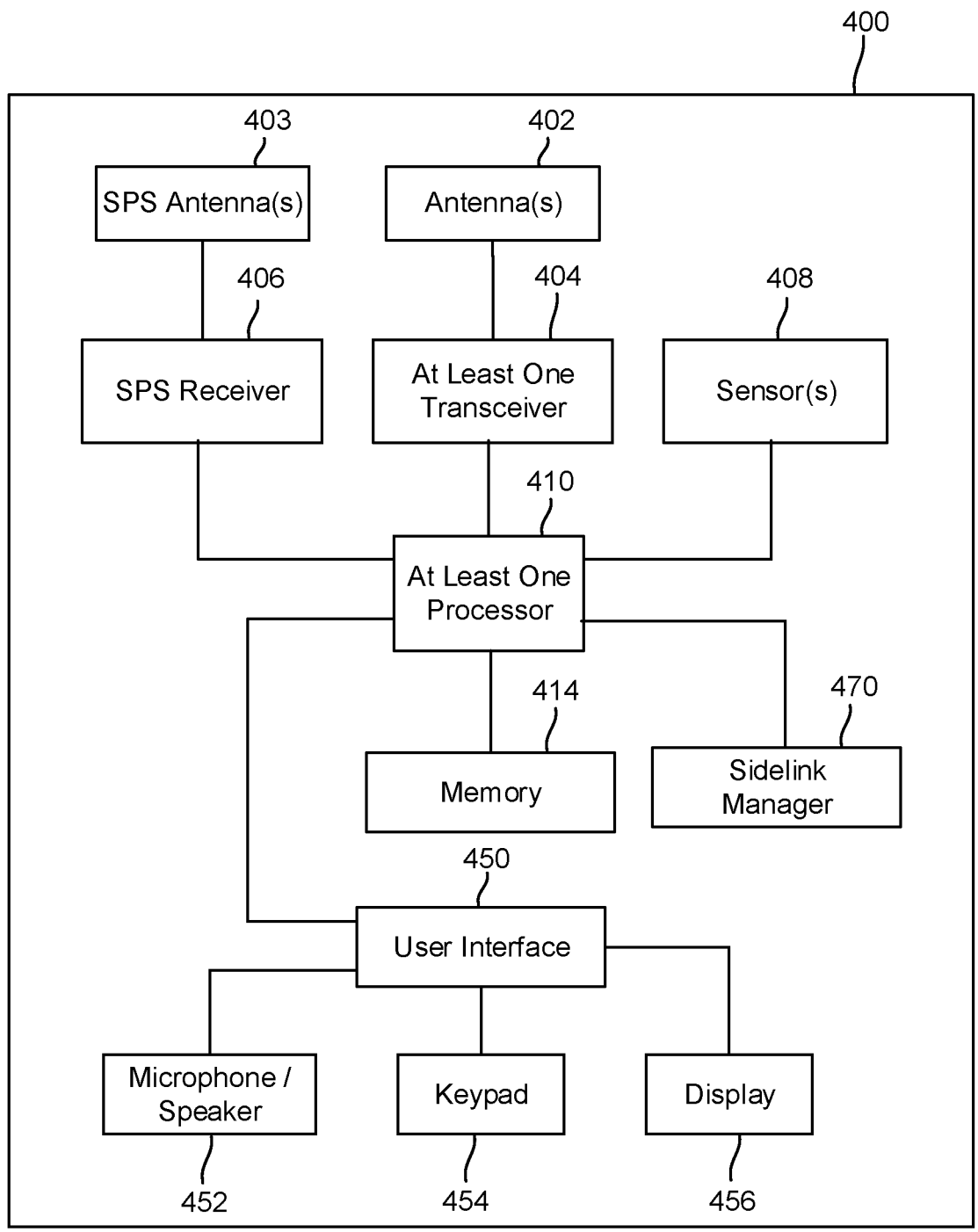
FIG. 4 is a block diagram illustrating various components of an example user equipment (UE), according to aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The at least one transceiver 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the at least one transceiver 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to one or more antennas 403 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to at least one processor 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The at least one processor 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The at least one processor 410 may therefore provide means for processing, such as means for determining, means for calculating, means for receiving, means for transmitting, means for indicating, etc. The at least one processor 410 may include any form of logic suitable for performing, or causing the components of the UE 400 to perform, at least the techniques described herein.

The at least one processor 410 may also be coupled to a memory 414 providing means for storing (including means for retrieving, means for maintaining, etc.) data and software instructions for executing programmed functionality within the UE 400. The memory 414 may be on-board the at least one processor 410 (e.g., within the same integrated circuit (IC) package), and/or the memory 414 may be external to the at least one processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the at least one processor 410. The sidelink manager 470 may be a hardware, software, or firmware component that, when executed, causes the UE 400 to perform the operations described herein. For example, the sidelink manager 470 may be a software module stored in memory 414 and executable by the at least one processor 410. As another example, the sidelink manager 470 may be a hardware circuit (e.g., an ASIC, a field-programmable gate array (FPGA), etc.) within the UE 400.

Figure 5:
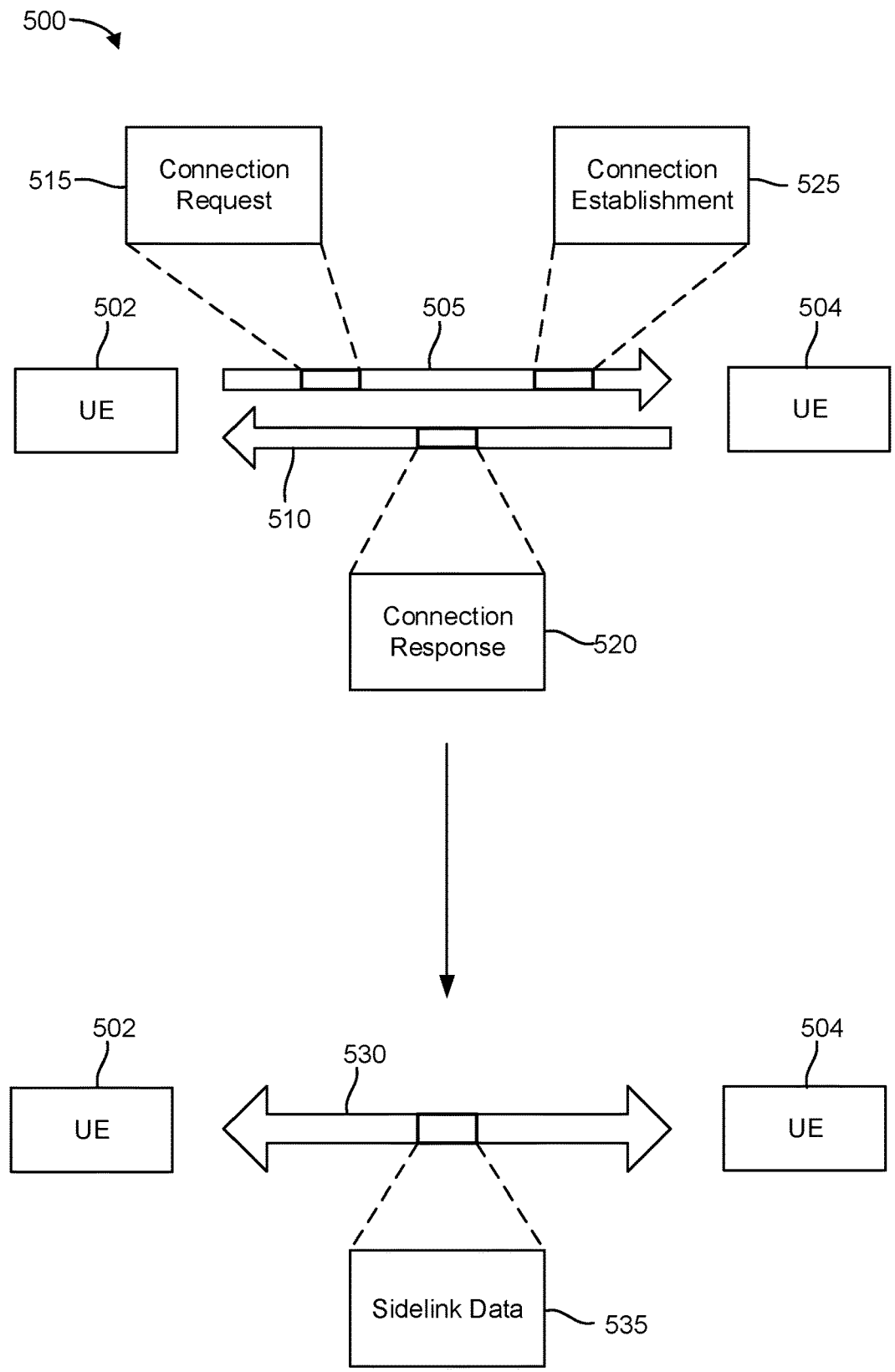
FIG. 5 illustrates an example of a wireless communications system that supports unicast sidelink establishment, according to aspects of the disclosure.

FIG. 5 illustrates an example of a wireless communications system 500 that supports wireless unicast sidelink establishment, according to aspects of the disclosure. In some examples, wireless communications system 500 may implement aspects of wireless communications systems 100, 200, and 250. Wireless communications system 500 may include a first UE 502 and a second UE 504, which may be examples of any of the UEs described herein. As specific examples, UEs 502 and 504 may correspond to V-UEs 160 in FIG. 1, UE 190 and UE 104 in FIG. 1 connected over D2D P2P link 192, or UEs 204 in FIGS. 2A and 2B.

In the example of FIG. 5, the UE 502 may attempt to establish a unicast connection over a sidelink with the UE 504, which may be a V2X sidelink between the UE 502 and UE 504. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 502 may be referred to as an initiating UE that initiates the sidelink connection procedure, and the UE 504 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 502 and UE 504. For example, a transmission and reception capability matching may be negotiated between the UE 502 and UE 504. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 502 and UE 504. Additionally, a security association may be established between UE 502 and UE 504 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 502 and UE 504.

In some cases, UE 504 may create a service announcement (e.g., a service capability message) to transmit over a cellular network (e.g., cV2X) to assist the sidelink connection establishment. Conventionally, UE 502 may identify and locate candidates for sidelink communications based on a basic service message (BSM) broadcasted unencrypted by nearby UEs (e.g., UE 504). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 502 is able to detect the BSM(s). Accordingly, the service announcement transmitted by UE 504 and other nearby UEs (e.g., a discovery signal) may be an upper layer signal and broadcasted (e.g., in an NR sidelink broadcast). In some cases, the UE 504 may include one or more parameters for itself in the service announcement, including connection parameters and/or capabilities it possesses. The UE 502 may then monitor for and receive the broadcasted service announcement to identify potential UEs for corresponding sidelink connections. In some cases, the UE 502 may identify the potential UEs based on the capabilities each UE indicates in their respective service announcements.

The service announcement may include information to assist the UE 502 (e.g., or any initiating UE) to identify the UE transmitting the service announcement (UE 504 in the example of FIG. 5). For example, the service announcement may include channel information where direct communication requests may be sent. In some cases, the channel information may be RAT-specific (e.g., specific to LTE or NR) and may include a resource pool within which UE 502 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 502 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 504 in the example of FIG. 5), the initiating UE (UE 502 in the example of FIG. 5) may transmit a connection request 515 to the identified target UE 504. In some cases, the connection request 515 may be a first RRC message transmitted by the UE 502 to request a unicast connection with the UE 504 (e.g., an "RRCSetupRequest" message). For example, the unicast connection may utilize the PC5 interface for the sidelink, and the connection request 515 may be an RRC connection setup request message. Additionally, the UE 502 may use a sidelink signaling radio bearer 505 to transport the connection request 515.

After receiving the connection request 515, the UE 504 may determine whether to accept or reject the connection request 515. The UE 504 may base this determination on a transmission/reception capability, an ability to accommodate the unicast connection over the sidelink, a particular service indicated for the unicast connection, the contents to be transmitted over the unicast connection, or a combination thereof. For example, if the UE 502 wants to use a first RAT to transmit or receive data, but the UE 504 does not support the first RAT, then the UE 504 may reject the connection request 515. Additionally or alternatively, the UE 504 may reject the connection request 515 based on being unable to accommodate the unicast connection over the sidelink due to limited radio resources, a scheduling issue, etc. Accordingly, the UE 504 may transmit an indication of whether the request is accepted or rejected in a connection response 520. Similar to the UE 502 and the connection request 515, the UE 504 may use a sidelink signaling radio bearer 510 to transport the connection response 520. Additionally, the connection response 520 may be a second RRC message transmitted by the UE 504 in response to the connection request 515 (e.g., an "RRCResponse" message).

In some cases, sidelink signaling radio bearers 505 and 510 may be the same sidelink signaling radio bearer or may be separate sidelink signaling radio bearers. Accordingly, a radio link control (RLC) layer acknowledged mode (AM) may be used for sidelink signaling radio bearers 505 and 510. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 520 indicates that the UE 504 accepted the connection request 515, the UE 502 may then transmit a connection establishment 525 message on the sidelink signaling radio bearer 505 to indicate that the unicast connection setup is complete. In some cases, the connection establishment 525 may be a third RRC message (e.g., an "RRCSetupComplete" message). Each of the connection request 515, the connection response 520, and the connection establishment 525 may use a basic capability when being transported from one UE to the other UE to enable each UE to be able to receive and decode the corresponding transmission (e.g., the RRC messages).

Additionally, identifiers may be used for each of the connection request 515, the connection response 520, and the connection establishment 525. For example, the identifiers may indicate which UE 502/504 is transmitting which message and/or for which UE 502/504 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 515 and/or the connection response 520 for UE 502 and/or UE 504, respectively, to enable negotiation of corresponding AS layer parameters for the unicast connection. For example, the UE 502 and/or UE 504 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 502 and/or UE 504 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 502 and/or UE 504 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 502 and/or UE 504 may include PHY layer parameters when establishing the unicast connection to set a PHY layer context for the unicast connection. For example, the PHY layer context may indicate a transmission format (unless transmission profiles are included for each UE 502/504) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 525 message is transmitted). Before a security association (e.g., security context) is established between the UE 502 and UE 504, the sidelink signaling radio bearers 505 and 510 may not be protected. After a security association is established, the sidelink signaling radio bearers 505 and 510 may be protected. Accordingly, the security context may enable secure data transmissions over the unicast connection and the sidelink signaling radio bearers 505 and 510. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 504 may base its decision on whether to accept or reject the connection request 515 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 502 and UE 504 may communicate using the unicast connection over a sidelink 530, where sidelink data 535 is transmitted between the two UEs 502 and 504. The sidelink 530 may correspond to sidelinks 162 and/or 168 in FIG. 1. In some cases, the sidelink data 535 may include RRC messages transmitted between the two UEs 502 and 504. To maintain this unicast connection on sidelink 530, UE 502 and/or UE 504 may transmit a keep alive message (e.g., "RRCLinkAlive" message, a fourth RRC message, etc.). In some cases, the keep alive message may be triggered periodically or on-demand (e.g., event-triggered). Accordingly, the triggering and transmission of the keep alive message may be invoked by UE 502 or by both UE 502 and UE 504. Additionally or alternatively, a MAC control element (CE)

(e.g., defined over sidelink 530) may be used to monitor the status of the unicast connection on sidelink 530 and maintain the connection. When the unicast connection is no longer needed (e.g., UE 502 travels far enough away from UE 504), either UE 502 and/or UE 504 may start a release procedure to drop the unicast connection over sidelink 530. Accordingly, subsequent RRC messages may not be transmitted between UE 502 and UE 504 on the unicast connection.

Figure 6:
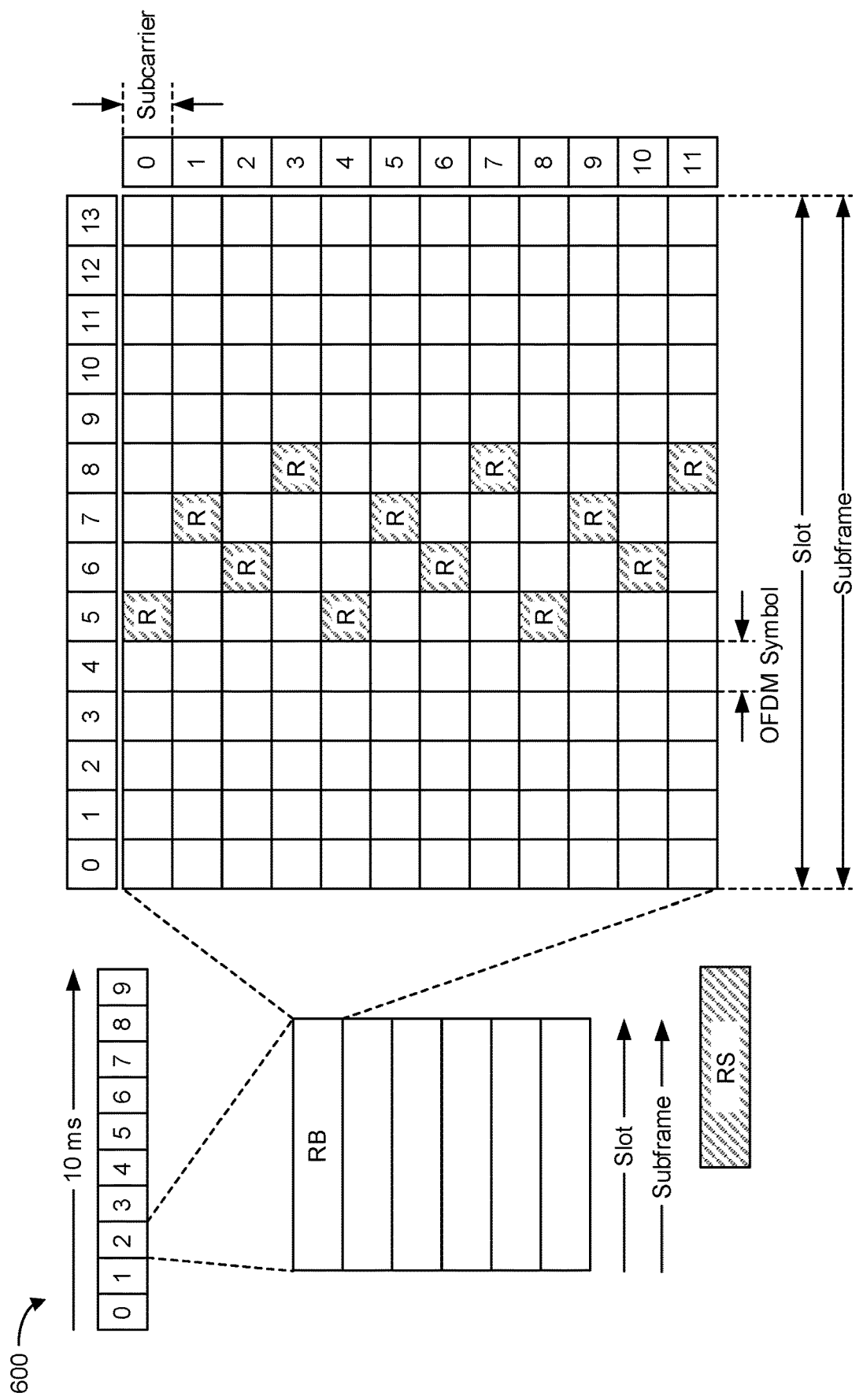
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

In an aspect, the reference signal carried on the REs labeled "R" may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 6, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 6); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or DCI).

Figure 7:
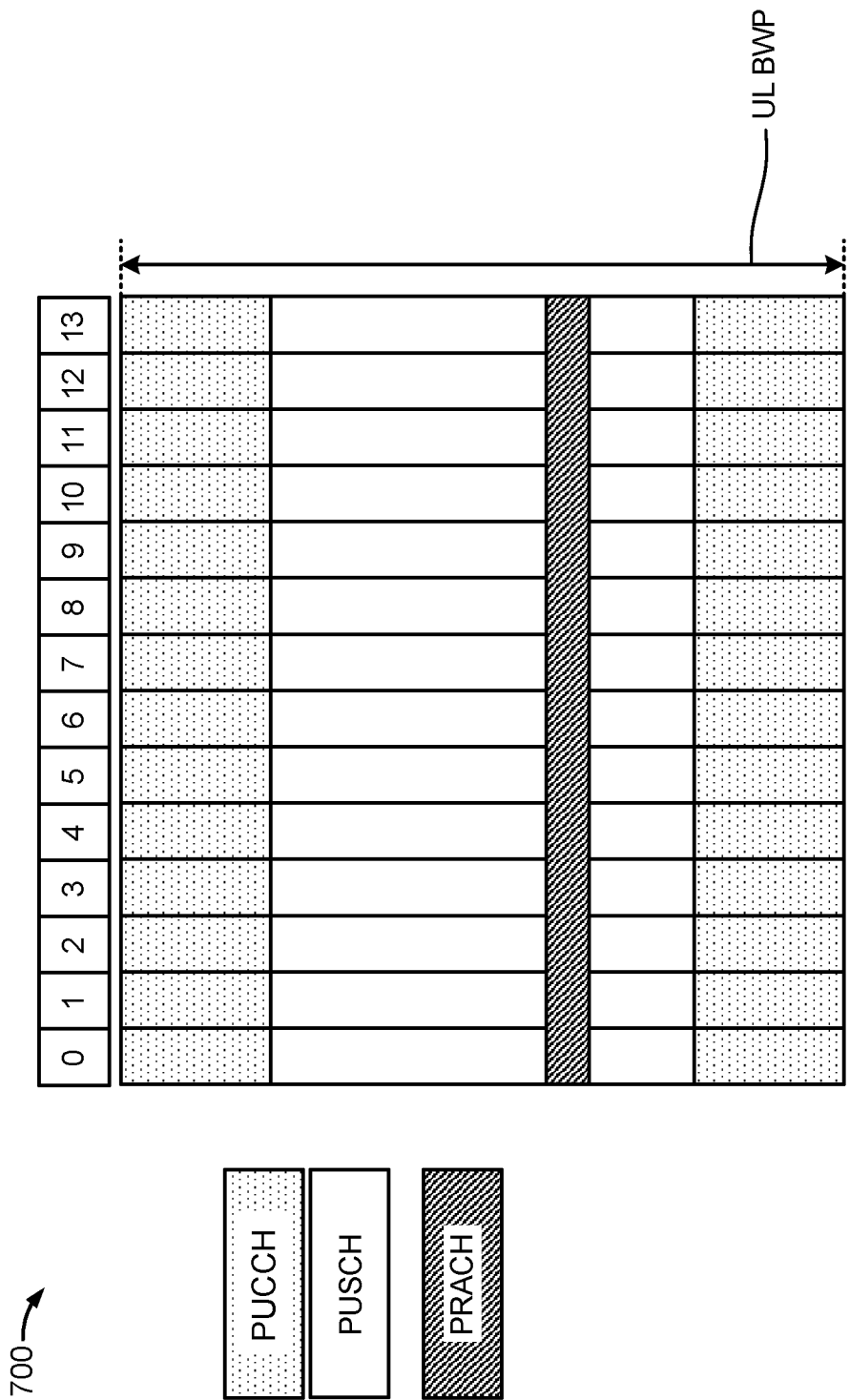
FIG. 7 is a diagram illustrating various uplink channels within an example uplink slot, according to aspects of the disclosure.

FIG. 7 is a diagram 700 illustrating various uplink channels within an example uplink slot. In FIG. 7, time is represented horizontally (on the X axis) with time increasing from left to right, while frequency is represented vertically (on the Y axis) with frequency increasing (or decreasing) from bottom to top. In the example of FIG. 7, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 8:
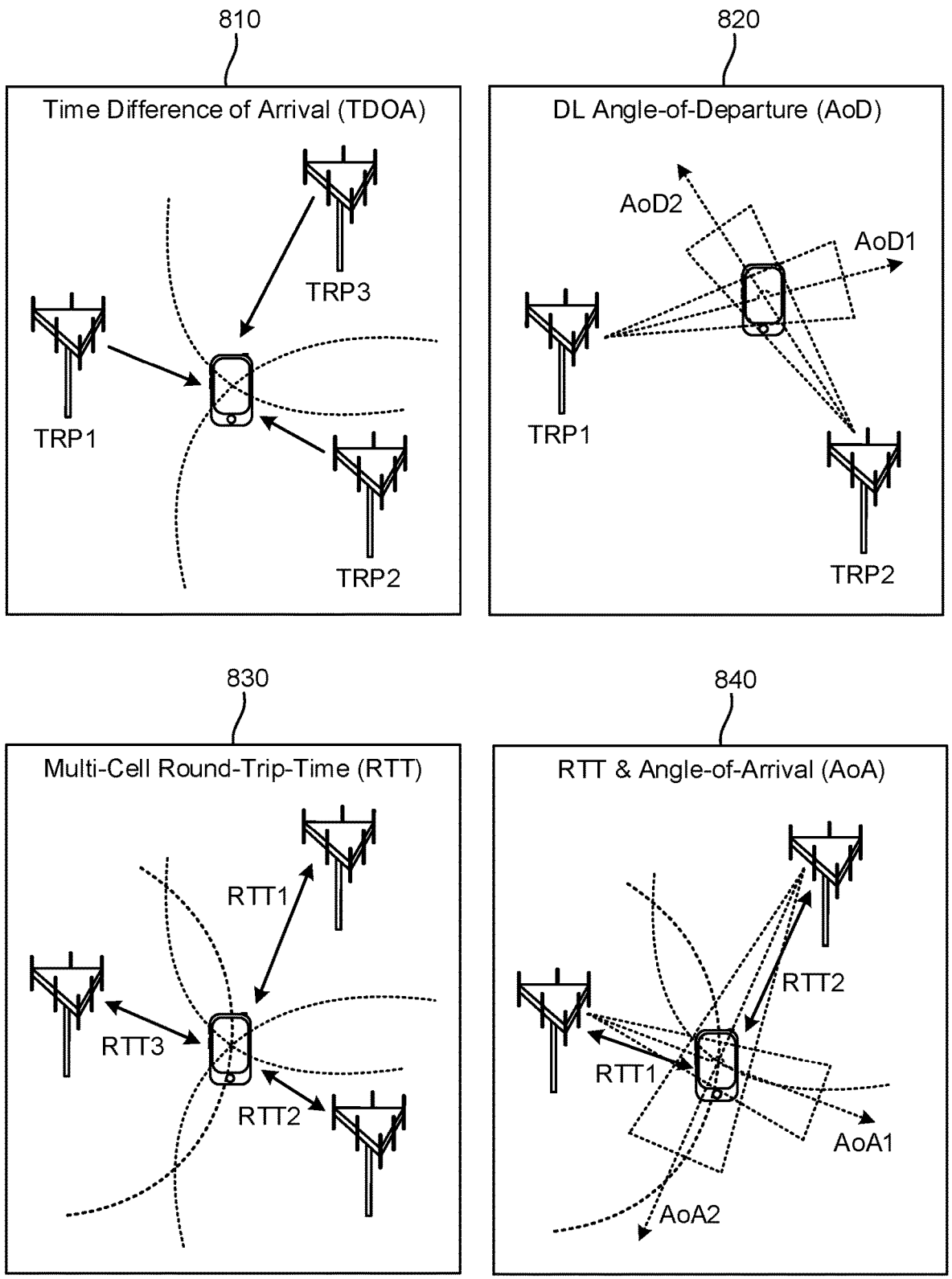
FIG. 8 illustrates examples of various positioning methods, according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 8 illustrates examples of various positioning methods, according to aspects of the disclosure. In an OTDOA or DL-TDOA positioning procedure, illustrated by scenario 810, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, illustrated by scenario 820, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, illustrated by scenario 830, a UE performs an RTT procedure with multiple base stations to enable its location to be determined (e.g., using multilateration) based on the known locations of the base stations. RTT and multi-RTT methods can be combined with other positioning techniques, such as UL-AoA, illustrated by scenario 840, and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 9:
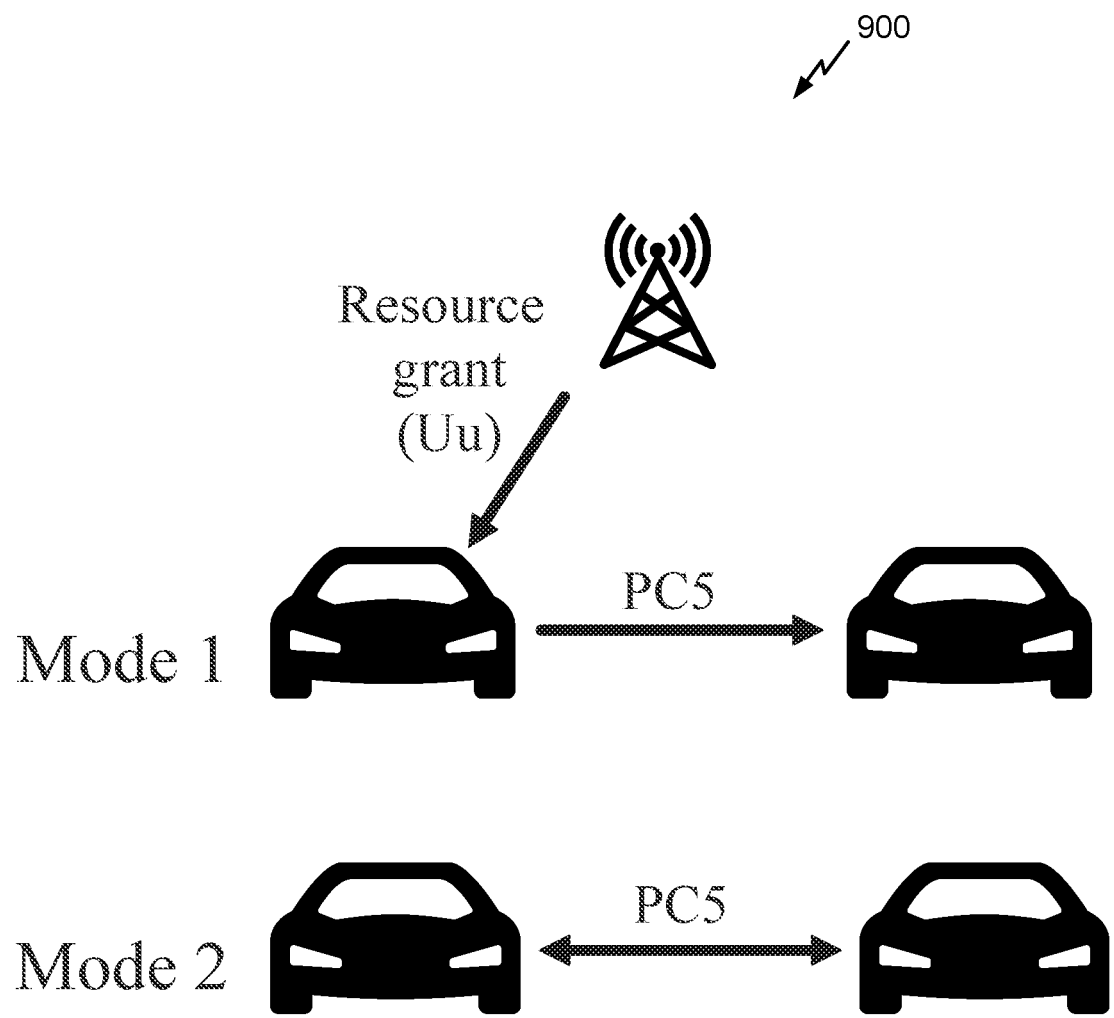
FIG. 9 illustrates sidelink communication scheduling (or resource allocation) schemes in accordance with aspects of the disclosure.

FIG. 9 illustrates sidelink communication scheduling (or resource allocation) schemes 900 in accordance with aspects of the disclosure. In some designs, resource allocation in V2X may be implemented via Mode 1, where gNB assigns Tx resources for sidelink communications through DCI 3_0. In other designs, resource allocation in V2X may be implemented via Mode 2, where a transmitting UE autonomously decides resources for sidelink communications. In some designs, the receiving UE behavior is the same for both Modes 1 and 2.

Referring to FIG. 9, Mode 1 supports dynamic grants (DG), configured grants (CG) type 1, and CG type 2. In some designs, CG type 1 is activated via RRC signaling from gNB. DCI 3_0 is transmitted by gNB to allocation time and frequency resources and indicates transmission timing. In some designs, the modulation and coding scheme (MCS) MCS is up to UE within limit set by gNB. In Mode 2, the transmitting UE performs channel sensing by blindly decoding all physical sidelink control channels (PSCCHs) and finds out reserved resources by other sidelink transmissions. The transmitting UE reports available resources to upper layer and upper layer decides resource usage.

In some designs, in industrial IoT (IIoT), sidelink can enable direct programmable logical controller (PLC) and sensors/actuators (SAs) communications. Wireless PLC is desired for flexible and simple deployment. In some designs, each PLC controls 20-50 SAs. In some designs, IIoT has low latency 1-2 ms and ultra-reliability requirement $10^{-6}$ error rate. In some designs, communication through gNB would require multiple OTAs, affecting latency and reliability.

IIoT traffics are typically deterministic and with small packet size 32-256 bytes. The required bandwidth is thus low, e.g., 2 RBs might be sufficient for some cases. SAs may have constraint on UE capability in terms of bandwidth and processing power. Overall bandwidth may be large for IIoT with dedicated frequency bands and/or unlicensed bands. In some designs, SAs need not detect/monitor all transmissions. In some designs, PSCCH has to meet stringent IIoT requirement. IIoT networks may also be associated with challenging RF environments due to blockage and interference.

In some designs, a $1^{st}$ stage sidelink control information (SCI) may be included in PSCCH. The $1^{st}$ stage SCI may alternatively be referred to as SCI 1-A. In some designs, SCI 1-A shall be decoded by intended RXs and other sidelink UEs (particularly in Mode 2) to allow channel sensing and avoid resource collision. In some designs, SCI 1-A may be configured as follows:

Priority 3 bits
Frequency resource assignment, bits depending on # of slot reservations and # sub channels
Time resource assignment, 5 or 9 bits for 2 or 3 reservations
Resource reservation period, bits depending on # allowed periods
DM-RS pattern, bits depending on # configured patterns
SCI 2 format, 2 bits
Beta offset for SCI 2 rate matching, 2 bits
DM-RS port, 1 bit indicating one or two data layers
MCS, 5 bits
Additional MCS table, 0-2 bits
PSFCH overhead indicator, 0 or 1 bit
Reserved bits, bits up to upper layer In some designs, a $2^{nd}$ stage SCI may be included in physical sidelink shared channel (PSSCH). The $2^{nd}$ stage SCI may alternatively be referred to as SCI 2. In some designs, SCI 2 is intended to help receiving UEs decode the PSSCH. In some designs, SCI 2 may be configured as follows:

HARQ ID, bits depending on # HARQ process
NDI, 1 bit
RV-ID, 2 bits
Source ID, 8 bits
Dest. ID, 16 bits
HARQ enable/disable, 1 bit SCI 2-A only fields: Cast type, 2 bits, broadcast, groupcast, unicast; CSI request, 1 bit SCI 2-B only fields (NACK-only groupcast): Zone ID, 12 bits; Communication range, 4 bits In addition to the downlink-based, uplink-based, and downlink-and-uplink-based positioning methods, NR supports various sidelink positioning techniques. For example, link-level ranging signals can be used to estimate the distance between pairs of V-UEs or between a V-UE and a roadside unit (RSU), similar to a round-trip-time (RTT) positioning procedure.

Figure 10:
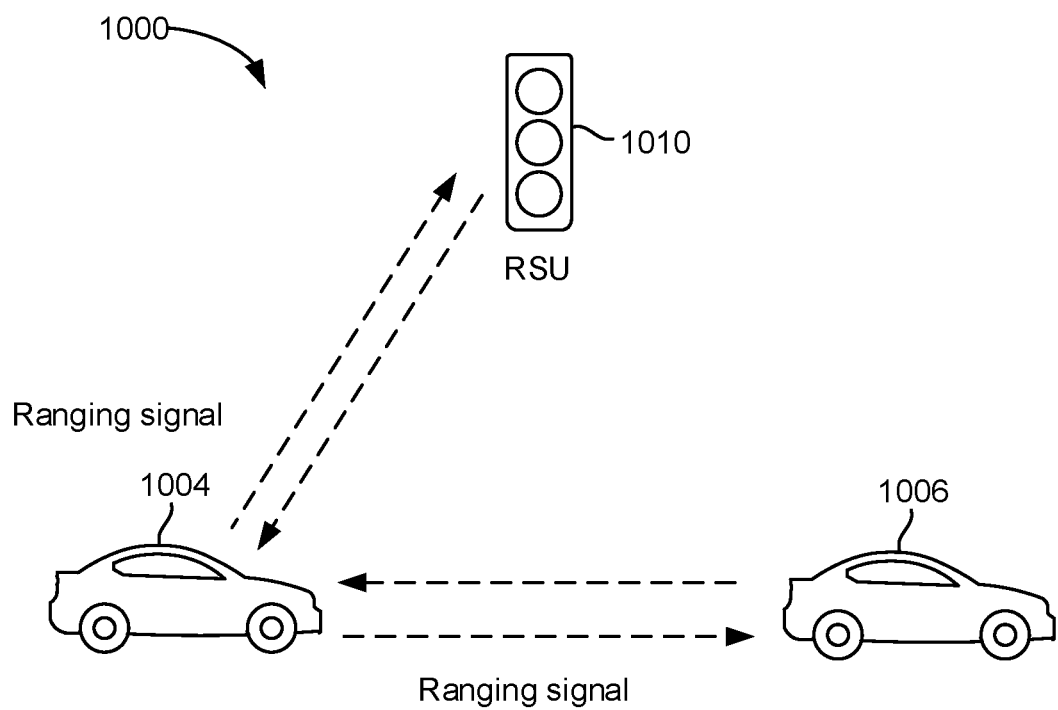
FIG. 10 illustrates an example wireless communication system in which a vehicle user equipment (V-UE) is exchanging ranging signals with a roadside unit (RSU) and another V-UE, according to aspects of the disclosure.

FIG. 10 illustrates an example wireless communication system 1000 in which a V-UE 1004 is exchanging ranging signals with an RSU 1010 and another V-UE 1006, according to aspects of the disclosure. As illustrated in FIG. 10, a wideband (e.g., FR1) ranging signal (e.g., a Zadoff Chu sequence) is transmitted by both end points (e.g., V-UE 1004 and RSU 1010 and V-UE 1004 and V-UE 1006). In an aspect, the ranging signals may be sidelink positioning reference signals (SL-PRS) transmitted by the involved V-UEs 1004 and 1006 on uplink resources. On receiving a ranging signal from a transmitter (e.g., V-UE 1004), the receiver (e.g., RSU 1010 and/or V-UE 1006) responds by sending a ranging signal that includes a measurement of the difference between the reception time of the ranging signal and the transmission time of the response ranging signal, referred to as the reception-to-transmission (Rx-Tx) time difference measurement of the receiver.

Upon receiving the response ranging signal, the transmitter (or other positioning entity) can calculate the RTT between the transmitter and the receiver based on the receiver's Rx-Tx time difference measurement and a measurement of the difference between the transmission time of the first ranging signal and the reception time of the response ranging signal (referred to as the transmission-to-reception (Tx-Rx) time difference measurement of the transmitter). The transmitter (or other positioning entity) uses the RTT and the speed of light to estimate the distance between the transmitter and the receiver. If one or both of the transmitter and receiver are capable of beamforming, the angle between the V-UEs 904 and 906 may also be able to be determined. In addition, if the receiver provides its global positioning system (GPS) location in the response ranging signal, the transmitter (or other positioning entity) may be able to determine an absolute location of the transmitter, as opposed to a relative location of the transmitter with respect to the receiver.

As will be appreciated, ranging accuracy improves with the bandwidth of the ranging signals. Specifically, a higher bandwidth can better separate the different multipaths of the ranging signals.

Note that this positioning procedure assumes that the involved V-UEs are time-synchronized (i.e., their system frame time is the same as, or has a known offset relative to, the other V-UE(s)). In addition, although FIG. 10 illustrates two V-UEs, as will be appreciated, they need not be V-UEs, and may instead be any other type of UE capable of sidelink communication.

Figure 11:
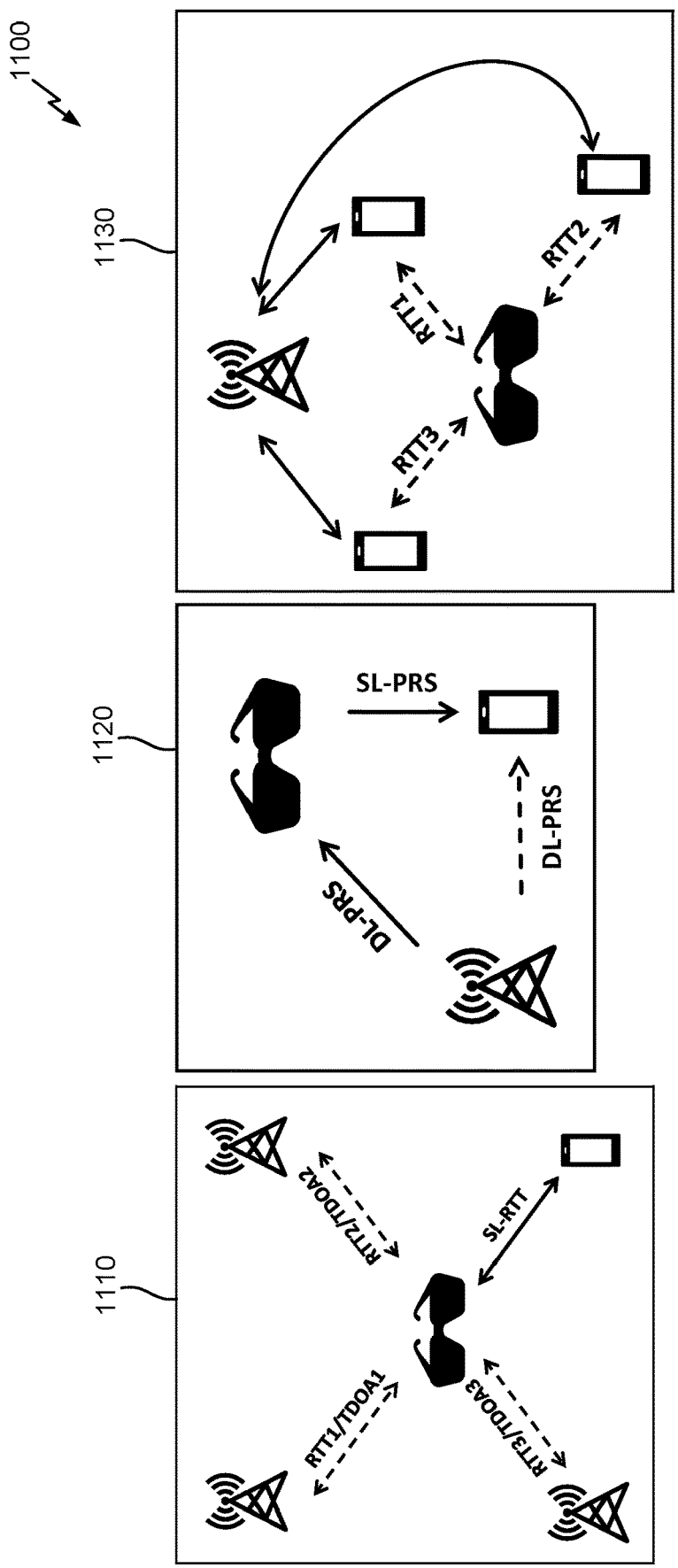
FIG. 11 illustrates other sidelink positioning schemes in accordance with aspects of the disclosure.

FIG. 11 illustrates other sidelink positioning schemes 1100 in accordance with aspects of the disclosure. In FIG. 11, each positioning scheme involves a target UE (in this case, a VR headset), at least one gNB, and at least one reference UE (e.g., a UE with a known location from a recent positioning fix, where such a location generally has a lower variance than a typical error estimate for UE position).

Referring to FIG. 11, scenario 1110 depicts a UE with a known location improving Uu positioning (e.g., RTT-based or TDOA-based) by providing an extra anchor. Scenario 1120 depicts positioning for a low-tier UE (e.g., VR headset) via the help from premium UEs (i.e., SL-only based positioning/ranging). Scenario 1130 depicts a relay or reference UE (with known location) participating in position estimation for a remote UE (e.g., VR headset) without UL PRS transmission in Uu. Each of the scenarios 1110-1130 may be broadly characterized as an SL-assisted positioning scheme.

The SL UEs that are assisting in position estimation of a target UE can impact various aspects associated with SL-assisted positioning, such as power consumption and/or position estimation accuracy.

Figure 12:
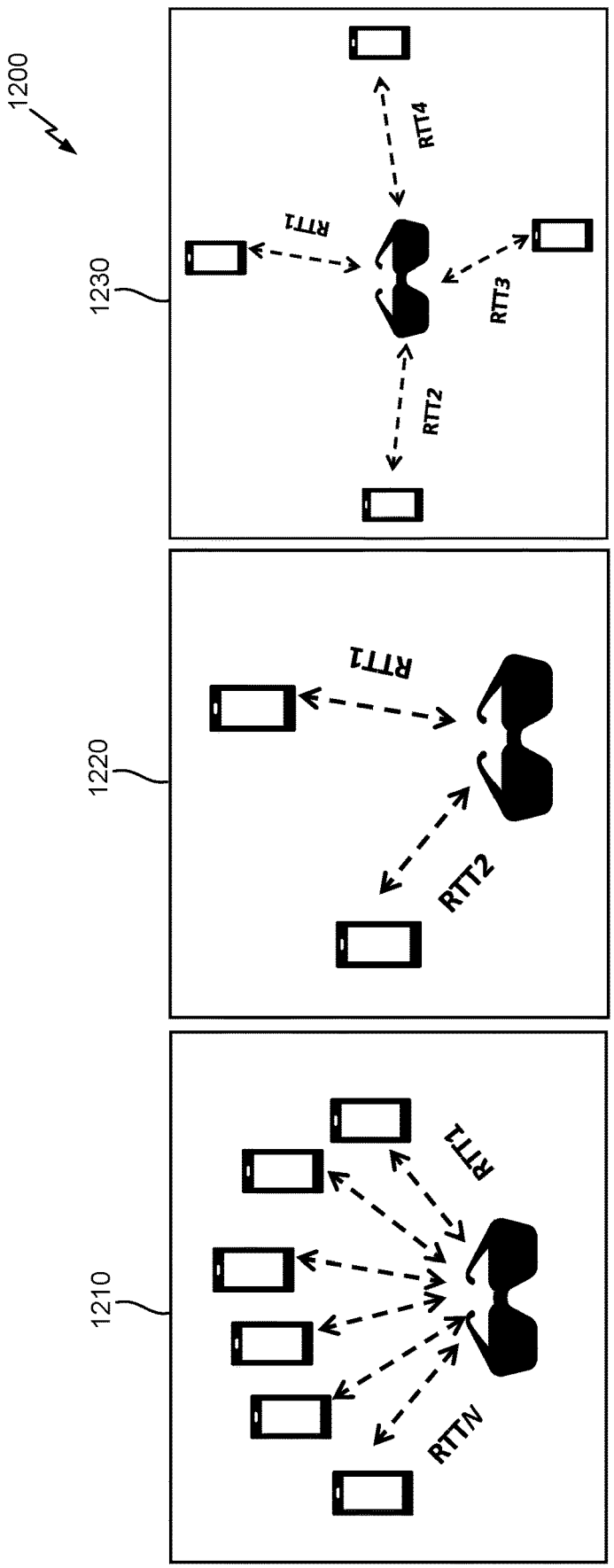
FIG. 12 illustrates other UE distribution scenarios for sidelink positioning in accordance with aspects of the disclosure.

FIG. 12 illustrates other UE distribution scenarios 1200 for sidelink positioning in accordance with aspects of the disclosure. In UE distribution scenario 1210, a high number of UEs participate in SL-assisted positioning, which is good for position estimation accuracy but also greatly increases power consumption. In UE distribution scenario 1220, only two UEs participate in SL-assisted positioning, which is good for power consumption but also reduces position estimation accuracy. In UE distribution scenario 1230, there is a reasonable number (i.e., 4) UEs participating in SL-assisted positioning, so the power consumption is not too high and the UEs are also well spaced apart with a sufficient number for good position estimation accuracy.

In NR, it is generally assumed that each UE position estimate is computed individually at the LMF ("UE-assisted" technique) or that each UE computes its own position ("UE-based" technique). As noted above with respect to FIG. 8, NR RAT-based position estimation may be facilitated through Uu links. In other implementations as noted above with respect to FIGS. 9-12, NR position estimation may be facilitated through SL (PC5) links, or a combination of Uu and SL links. For example, SL-assisted position estimation may be based on at least one non-gNB type transmitter (e.g., another UE) whose location may be known (in case in absolute position) or not known (still useful for relative positioning).

In some legacy systems, SL-assisted position estimation is used primarily for DL-based position estimation (e.g., based on DL-PRS). Aspects of the disclosure are directed to an uplink-based sidelink-assisted position estimation procedure (e.g., based at least in part upon transmission of UL SRS-P and SL SRS-P). In some designs, such aspects may be leveraged so as to limit the extent of SRS-P transmission, or alternatively to increase position estimation accuracy. In the former case, such aspects may provide technical advantages such as reducing power consumption, limiting SRS pollution, serving more users simultaneously (e.g., SRS multiplexing capacity is limited due to limited SRS sequences and configurations). Such aspects may be implemented in various technological environments where UEs may have limited computational capabilities and/or power (e.g., an IIoT factory environment with a high number of low-tier sensors, such as AGVs, robotic arms, etc.).

Figure 13:
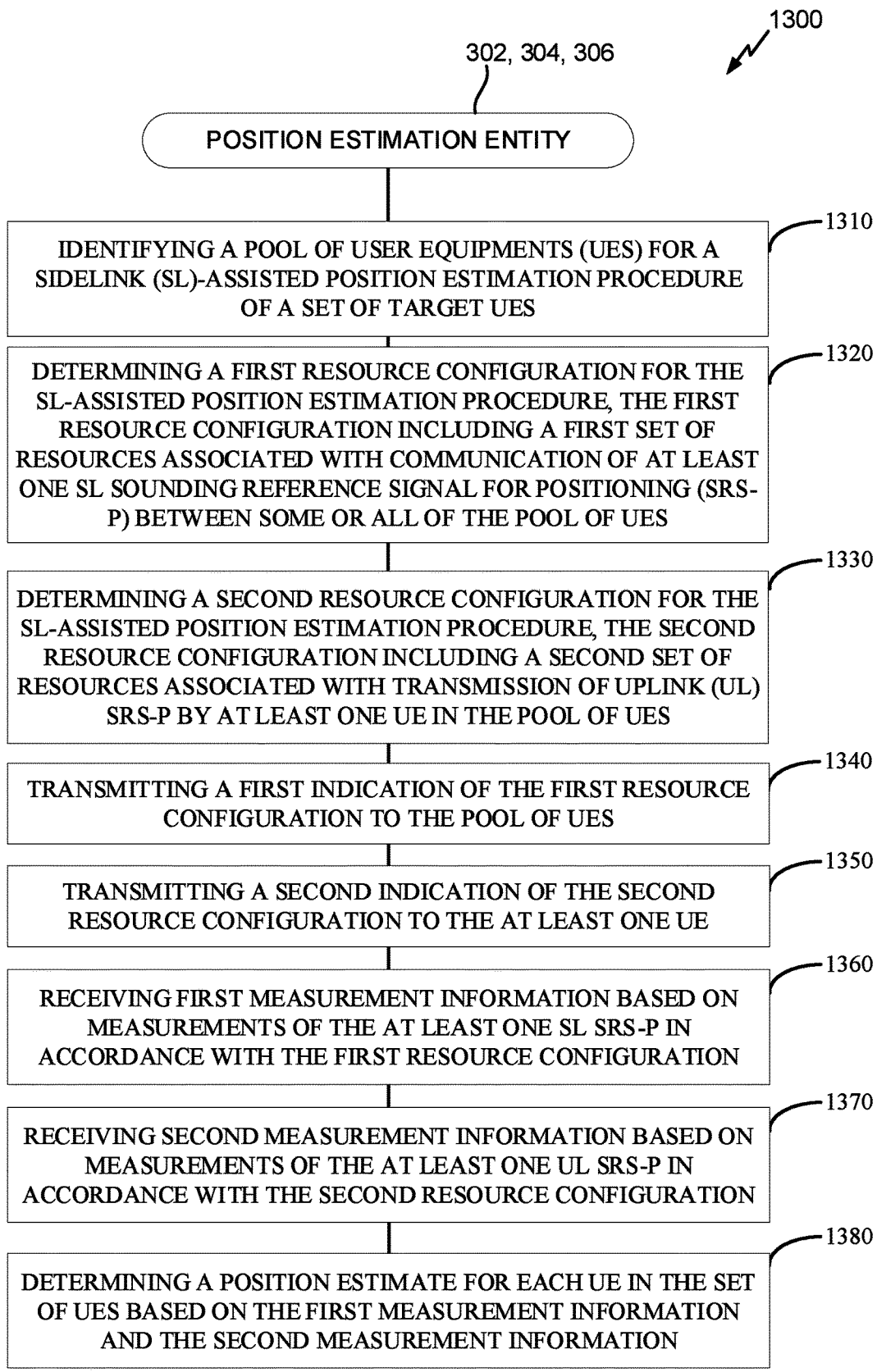
FIG. 13 illustrates an exemplary process of wireless communication, according to aspects of the disclosure.

FIG. 13 illustrates an exemplary process 1300 of wireless communication, according to aspects of the disclosure. In an aspect, the process 1300 may be performed by a position estimation entity, which may correspond to UE 302 (e.g., for UE-based position estimation) or to a network component such as BS 304 (e.g., in case location server or LMF is integrated in RAN) or a network entity 306 (e.g., a core network component or external location server or LMF).

Referring to FIG. 13, at 1310, the position estimation entity (e.g., processor(s) 332 or 384 or 394, SRS component 342 or 388 or 398, etc.) identifies a pool of UEs for a sidelink (SL)-assisted position estimation procedure of a set of target UEs. In some designs, the pool of UEs may include the set of target UEs plus one or more additional UEs (e.g., anchor UEs whose location is already known, etc.). In some designs, a means for performing the identification at 1310 may include processor(s) 332 or 384 or 394, SRS component 342 or 388 or 398, etc., depending on whether the position estimation entity is implemented at UE 302, BS 304 or network entity 306.

Referring to FIG. 13, at 1320, the position estimation entity (e.g., processor(s) 332 or 384 or 394, SRS component 342 or 388 or 398, etc.) determines a first resource configuration for the SL-assisted position estimation procedure, the first resource configuration including a first set of resources associated with communication of at least one SL sounding reference signal for positioning (SRS-P) between some or all of the pool of UEs. In some designs, a means for performing the determination at 1320 may include processor(s) 332 or 384 or 394, SRS component 342 or 388 or 398, etc., depending on whether the position estimation entity is implemented at UE 302, BS 304 or network entity 306.

Referring to FIG. 13, at 1330, the position estimation entity (e.g., processor(s) 332 or 384 or 394, SRS component 342 or 388 or 398, etc.) determines a second resource configuration for the SL-assisted position estimation procedure, the second resource configuration including a second set of resources associated with transmission of uplink (UL) SRS-P by at least one UE in the pool of UEs. In some designs, a means for performing the determination at 1330 may include processor(s) 332 or 384 or 394, SRS component 342 or 388 or 398, etc., depending on whether the position estimation entity is implemented at UE 302, BS 304 or network entity 306.

Referring to FIG. 13, at 1340, the position estimation entity (e.g., transmitter 314 or 324 or 354 or 364, network transceiver(s) 380 or 390, etc.) transmits a first indication of the first resource configuration to the pool of UEs. In some designs, a means for performing the transmission at 1340 may include transmitter 314 or 324 or 354 or 364, network transceiver(s) 380 or 390, etc., depending on whether the position estimation entity is implemented at UE 302, BS 304 or network entity 306.

Referring to FIG. 13, at 1350, the position estimation entity (e.g., transmitter 314 or 324 or 354 or 364, network transceiver(s) 380 or 390, etc.) transmits a second indication of the second resource configuration to the at least one UE. In some designs, the second resource configuration may also be conveyed to one or more gNBs (or TRPs) which will then measure the UL SRS-P(s) on the second set of resources, and report back to the position estimation entity. In some designs, a means for performing the transmission at 1350 may include transmitter 314 or 324 or 354 or 364, network transceiver(s) 380 or 390, etc., depending on whether the position estimation entity is implemented at UE 302, BS 304 or network entity 306.

Referring to FIG. 13, at 1360, the position estimation entity (e.g., receiver 312 or 322 or 352 or 362, network transceiver(s) 380 or 390, etc.) receives first measurement information based on measurements of the at least one SL SRS-P in accordance with the first resource configuration. In some designs, the first measurement data may be based on multiple SL SRS-Ps (e.g., Rx-Tx measurements which correspond to a delay from an SL SRS-P receive time and SL SRS-P transmit time, and may be used for RTT measurements, etc.). Alternatively, the first measurement data may include measured UL TOAs and/or UL TDOA data. In some designs, a means for performing the reception at 1360 may include receiver 312 or 322 or 352 or 362, network trans-ceiver(s) 380 or 390, etc., depending on whether the position estimation entity is implemented at UE 302, BS 304 or network entity 306.

Referring to FIG. 13, at 1370, the position estimation entity (e.g., receiver 312 or 322 or 352 or 362, network transceiver(s) 380 or 390, etc.) receives second measurement information based on measurements of the at least one UL SRS-P in accordance with the second resource configuration. In some designs, the second measurement data may be based on multiple SRS-Ps (e.g., Rx-Tx measurements which correspond to a delay from an DL or UL SRS-P receive time and DL or UL SRS-P transmit time, and may be used for RTT measurements, etc.). Alternatively, the second measurement data may include measured UL TOAs and/or UL TDOA data. In some designs, a means for performing the reception at 1370 may include receiver 312 or 322 or 352 or 362, network transceiver(s) 380 or 390, etc., depending on whether the position estimation entity is implemented at UE 302, BS 304 or network entity 306.

Referring to FIG. 13, at 1370, the position estimation entity (e.g., processor(s) 332 or 384 or 394, SRS component 342 or 388 or 398, etc.) determines a position estimate for each UE in the set of UEs based on the first measurement information and the second measurement information. In some designs, a means for performing the determination at 1370 may include processor(s) 332 or 384 or 394, SRS component 342 or 388 or 398, etc., depending on whether the position estimation entity is implemented at UE 302, BS 304 or network entity 306.

Figure 14:
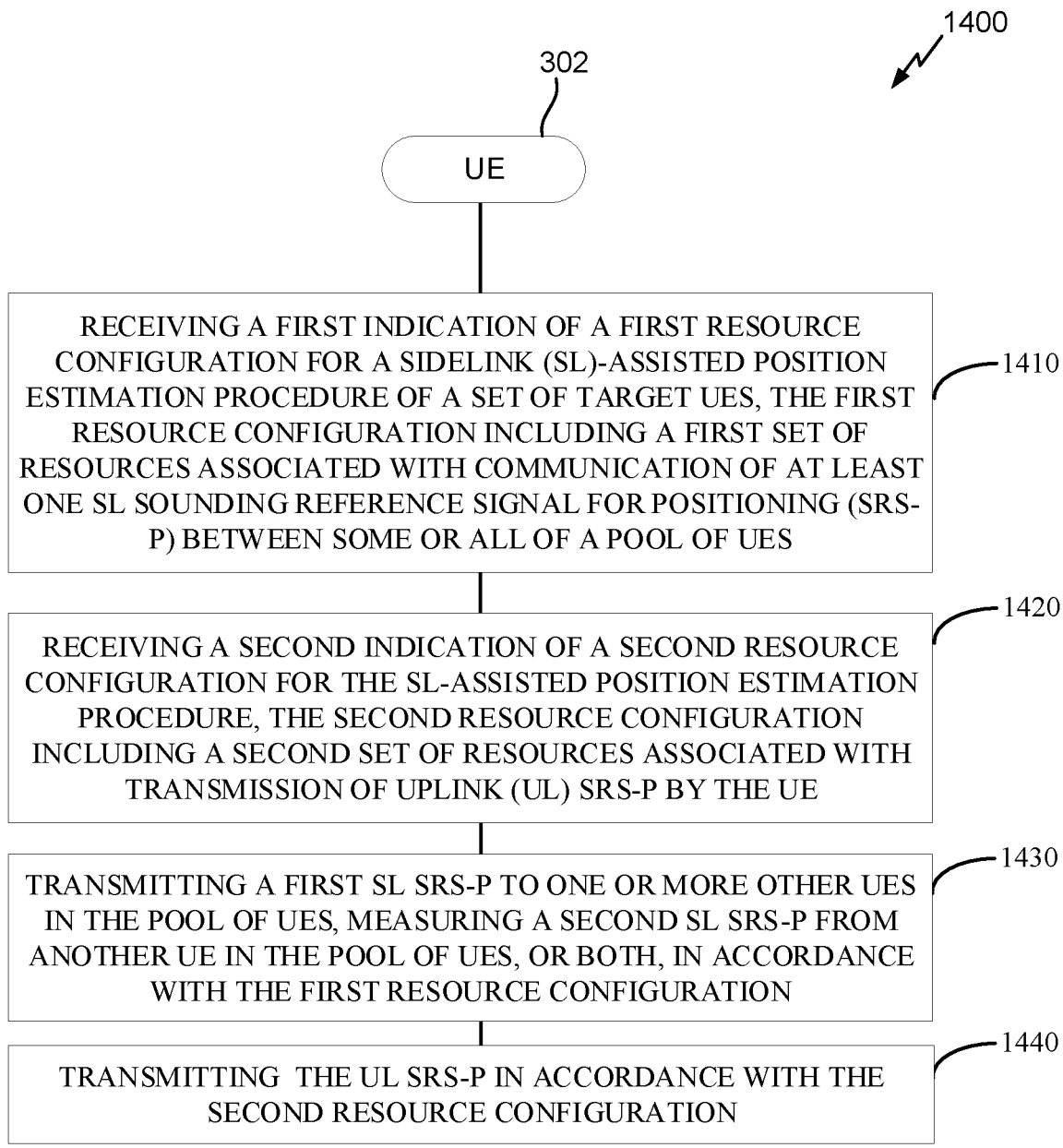
FIG. 14 illustrates an exemplary process of wireless communication, according to aspects of the disclosure.

FIG. 14 illustrates an exemplary process 1400 of wireless communication, according to aspects of the disclosure. In an aspect, the process 1400 may be performed by a UE such as UE 302.

Referring to FIG. 14, at 1410, UE 302 (e.g., receiver 312 or 322, etc.) receives a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs. In some designs, the pool of UEs may include a set of target UEs for which a position estimate is desired plus one or more additional UEs (e.g., anchor UEs whose location is already known, etc.). In some designs, a means for performing the reception at 1410 may include receiver 312 or 322 of UE 302.

Referring to FIG. 14, at 1420, UE 302 (e.g., receiver 312 or 322, etc.) receives a second indication of a second resource configuration for the SL-assisted position estimation procedure, the second resource configuration including a second set of resources associated with transmission of uplink (UL) SRS-P by the UE. In some designs, a means for performing the reception at 1420 may include receiver 312 or 322 of UE 302.

Referring to FIG. 14, at 1430, UE 302 (e.g., receiver 312 or 322, transmitter 314 or 324, SRS component 342, etc.) transmits a first SL SRS-P to one or more other UEs in the pool of UEs, measures a second SL SRS-P from another UE in the pool of UEs, or both, in accordance with the first resource configuration. In some designs, a means for performing the transmission and/or measurement at 1430 may include receiver 312 or 322 or transmitter 314 or 324 or SRS component 342 of UE 302.

Referring to FIG. 14, at 1430, UE 302 (e.g., transmitter 314 or 324, etc.) transmits the UL SRS-P in accordance with the second resource configuration. In some designs, less than all of the UEs in the pool of UEs may be designated to transmit the UL SRS-P (e.g., to conserve power, limit SRS pollution, etc.). Alternatively, if high accuracy is desired, a higher number of UEs in the pool of UEs (and theoretically all such UEs) may be designated to transmit the UL SRS-P in accordance with the second resource configuration. Parameters that may be evaluated to select which UE(s) are to transmit the UL SRS-P will be described below in more detail. In some designs, a means for performing the transmission at 1440 may include transmitter 314 or 324 of UE 302.

Referring to FIGS. 13-14, in some designs, prior to the transmission of the first indication, each UE in the pool of UEs has an established SL connection to each other UE in the pool of UEs with which a respective SL SRS-P is to be communicated in accordance with the first resource configuration. For example, the position estimation entity may wish to add only SL-connected UEs to the pool of UEs so as to reduce position estimation latency (e.g., rather than ping any non-connected UEs and then waiting for such UEs to form SL connections). Alternatively, in other designs, one or more SL connections between UEs in the pool of UEs are setup in conjunction with the SL-assisted position estimation procedure. Hence, some or all of the SL connections may be setup on-demand specifically to facilitate the SL-assisted position estimation procedure in some designs (e.g., more position estimation latency, but also more accuracy due to additional UEs participating in the SL-assisted position estimation procedure). In some designs, the SL connection setup may be a one-time setup operation (e.g., more latency for setup for an initial SL-assisted position estimation procedure, but then subsequent SL-assisted position estimation procedures can be performed without this setup latency).

Referring to FIGS. 13-14, in some designs, the communication of the UL SRS-P(s) may be implemented either before or after the communication of the SL SRS-P(s). In a first example, assume that the first set of resources precedes the second set of resources such that the at least one SL SRS-P is communicated before transmission of the at least one UL SRS-P.

In an example, to facilitate the SL SRS-P part of the SL-assisted position estimation procedure, the network (e.g., position estimation entity) may provide assistance data for some or all UEs in the pool to other UEs in the pool. In some designs, the assistance data may include range and/or angle, with respect to another UE from the pool. In some designs, the assistance data may include RSTD values of a UE with respect to another set of UEs in the pool (e.g., some UEs may be synchronized by design, such as through cables, or their clocks can be resynchronized with very high frequency, especially in indoor factory environments). In this case, RSTD would be meaningful (e.g., RSTD generally requires common synchronization (or known synchronization offset) between the receiving nodes).

Referring to FIGS. 13-14, in some designs, the first measurement data may be received at the position estimation entity via individual reports from a plurality of UEs in the pool of UEs that measure the at least one SL SRS-P, or some or all of the first measurement data as measured by the plurality of UEs is received via a lead UE of the pool of UEs (e.g., for more compact reporting, fewer measurement reports, etc.). For example, the lead UE may collect the first measurement data from various UEs via SL signaling, and then report the first measurement data to the position estimation entity via Uu signaling (e.g., at least, in a scenario where the position estimation entity corresponds to a network component).

Referring to FIGS. 13-14, in some designs, the position estimation entity may select the at least one UE in the pool of UEs for transmission of the at least one UL SRS-P based in part upon the first measurement information. In a specific example, the selection is based upon an overhead parameter, an accuracy parameter, a UE capability parameter, a power parameter, a quality parameter, a geographic parameter, or a combination thereof. For example, the selection criteria may include configured so as to:

Minimize the number of UL SRS-P transmissions: In this case, the chosen set is a minimal set of UL SRS-P transmissions required to derive the position estimates of all target UEs in the pool using the available first measurement information (e.g., one UE transmits UL SRS-p, and all other UEs in the pool know their relative position with regard to the transmitting UE. All positions can be derived with just one UL SRS-P transmission).

Maximize the accuracy: In this case, the set of transmitting UEs is chosen such that the estimated accuracy of the positioning is maximized (e.g., all UEs in the pool of UEs can be requested to transmit UL SRS-P. In this case, no UL SRS-P transmission is saved, but the first measurement data can be used to improve the accuracy of the position estimation. For example, more equations input to the positioning engine can help reduce the uncertainty margins and constrain the admissible set of solutions).

Trading-off between accuracy and network load: In this case, the network chooses a subset of UEs from the pool of UEs such that a certain level of accuracy is provided while saving the overall SRS transmissions.

UE capability/power considerations: In this case, the network prioritizes UL SRS-P transmissions from UEs with more capabilities (e.g., more bandwidth, such as 100 MHz for premium UEs as opposed to 20 MHz or even 5 MHz for certain low-tier UEs) and/or more power (e.g., a UE with more transmission power may be selected, or a UE with more battery power may be selected, etc.), a geographic parameter such as location (e.g., centrally located UEs among the pool of UE may transmit while outlier or edge-located UEs in the SL UE group may skip transmission of UL SRS-P, designate 1+ UEs per clique of UEs in the pool of UEs, etc.), etc.

Quality of transmissions: In an example, the network favors transmissions from UEs with higher likelihood of LOS.

Referring to FIGS. 13-14, in some designs, the second set of resources precedes the first set of resources such that the at least one transmission of the UL SRS-P occurs before the at least one SL SRS-P is communicated. Hence, the UL SRS-P communication(s) and SL SRS-P communication(s) may occur in any order.

Referring to FIGS. 13-14, in some designs, the UEs designated for UL SRS-P transmission(s) may be modified by the position estimation entity between SL-assisted position estimation procedures. In other words, if the position estimation entity determines to perform another SL-assisted position estimation procedure including some or all of the pool of UEs, the at least one UE designated to transmit the at least one UL SRS-P may optionally be updated for the another SL-assisted position estimation procedure based on information obtained in association with the SL-assisted position estimation procedure. For example, the position estimation entity may determine that two UEs transmitting UL SRS-P are too close together and may choose to stagger the UEs transmitting UL SRS-P more geographically. In another example, the position estimation entity may determine that more accuracy is needed, and may select more UEs to transmit UL SRS-P for the next SL-assisted position estimation procedure, and so on.

Referring to FIGS. 13-14, in some designs, the position estimation entity may transmit indications of the determined position estimates. In some designs, the indications of the determined position estimates may be transmitted individually to each of the set of target UEs (e.g., via separate Uu communications in case of network implementation of the position estimation entity, or separate SL communications in case of UE implementation of the position estimation entity). Alternatively, at least one of the indications of the determined position estimates is transmitted to a lead UE for forwarding (e.g., SL-based forwarding) to a respective target UE (e.g., convey all determined position estimates to lead UE via Uu signaling, and the lead UE then disseminates the determined position estimates to the target UE(s) via SL signaling).

Referring to FIGS. 13-14, in some designs as noted above, one or more UEs in the pool of UEs is not part of the set of target UEs. For example, the one or more UEs may correspond to anchor UEs associated with one or more known position estimates. Alternatively, the one or more UEs need not be anchor UEs (e.g., UEs can be added to pool which are not target UEs but at same time are not anchor UEs, and are used for relative position estimation or to corroborate or validate other positioning measurements associated with the SL-assisted position estimation procedure).

Figure 15:
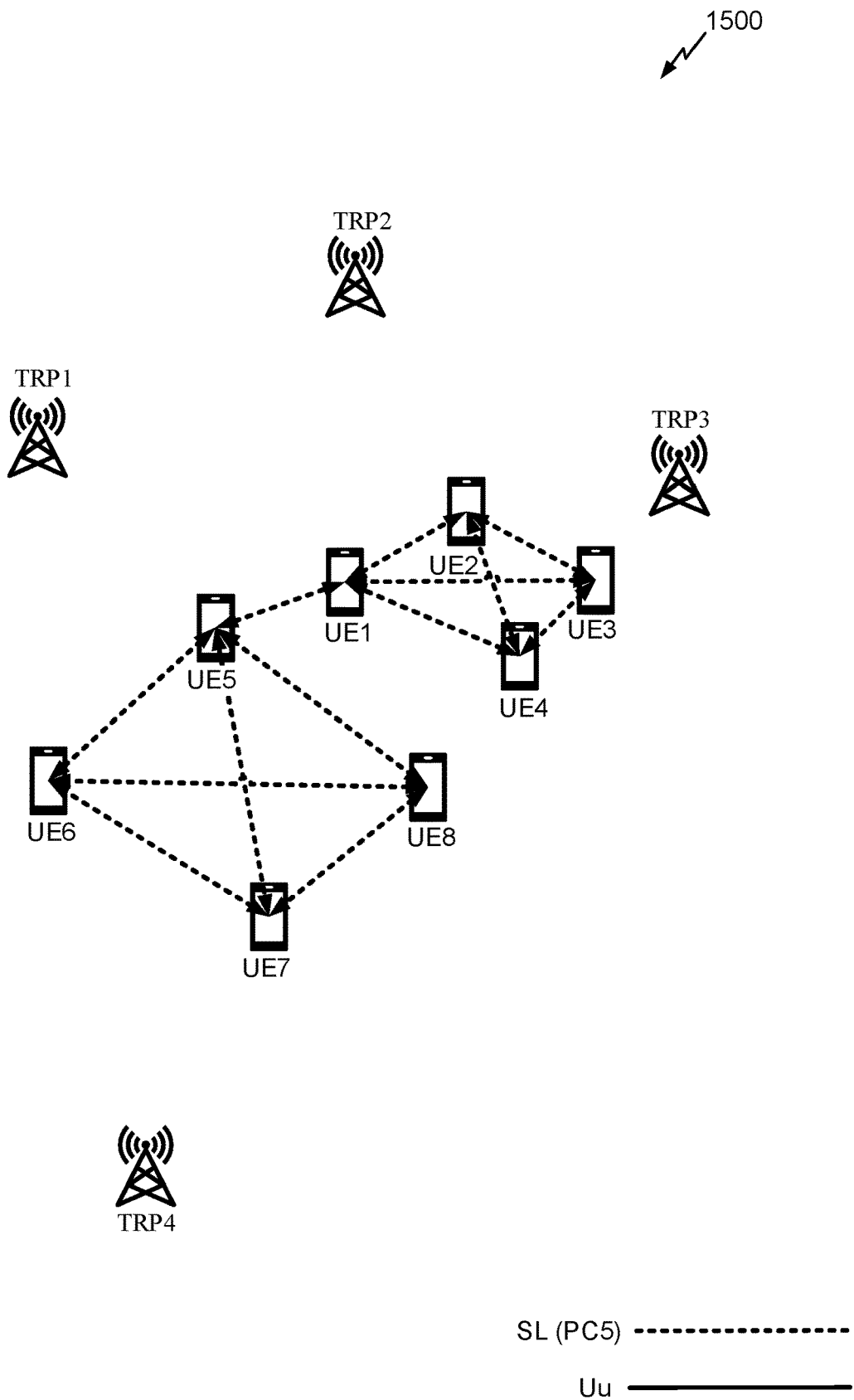
FIG. 15 illustrates an example implementation of the processes of FIGS. 13-14, respectively, in accordance with an aspect of the disclosure.

FIG. 15 illustrates an example implementation 1500 of the processes 1300-1400 of FIGS. 13-14, respectively, in accordance with an aspect of the disclosure. Referring to FIG. 15, the SL connections between the pool of UEs over with the SL SRS-Ps are communicated are indicated via dotted lines. As shown in FIG. 15, the pool of UEs is made up of UEs 1-8 and includes two "cliques" (which may be alternatively characterized as sub-groups of subsets of the pool of UEs), whereby each UE in a clique has an established SL connection to each other UE in the same clique. In this case, UEs 1-4 form a first clique, and UEs 5-8 form a second clique. The first and second cliques are connected for the SL connection between UE 1 and UE 5. Accordingly, in some designs, the pool of UEs includes two or more cliques, each UE in a respective clique has an established SL connection to each other UE in the same clique, and at least one UE in each respective clique has an established SL connection to at least one other UE in at least one other respective clique.

Figure 16:
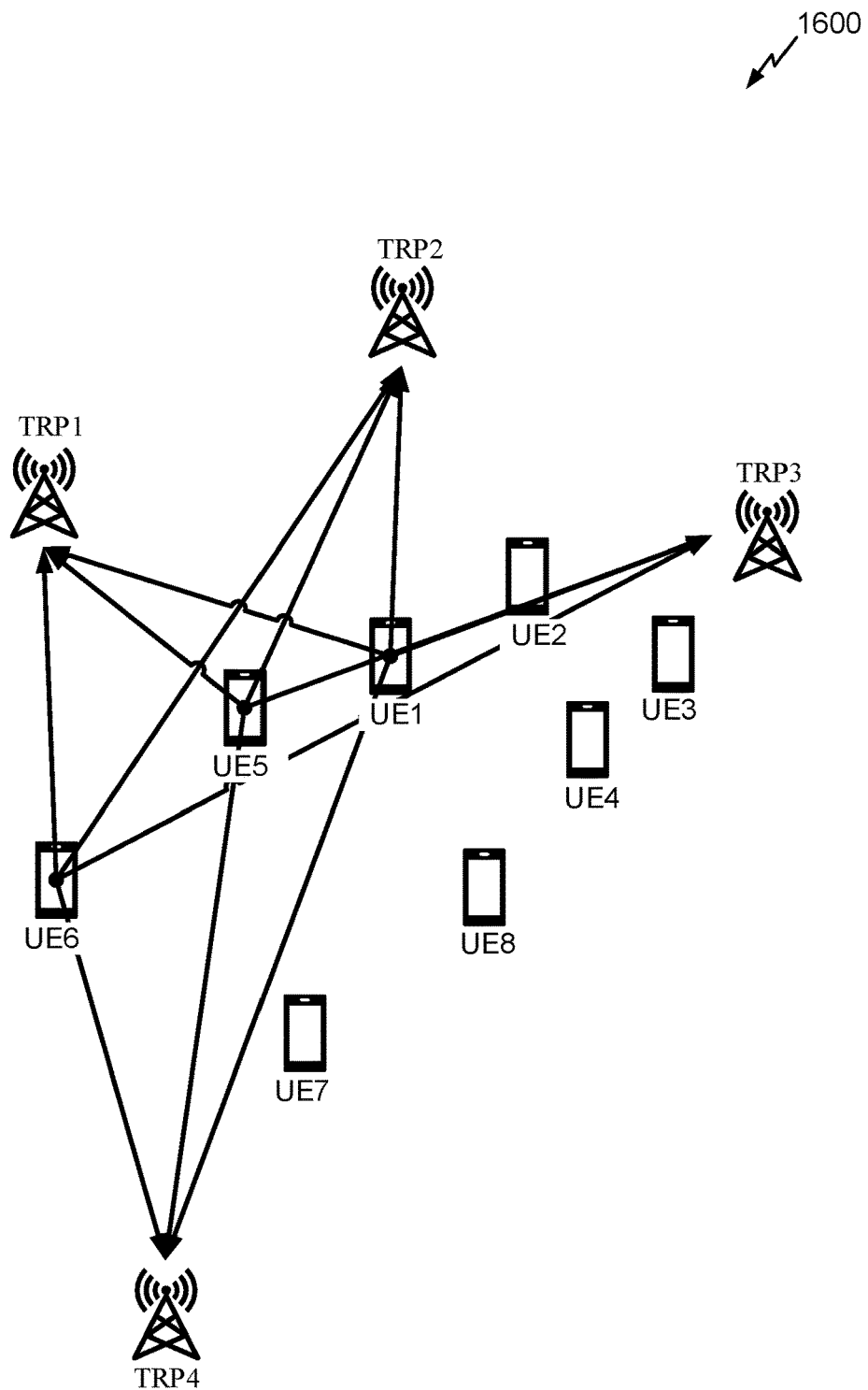
FIG. 16 illustrates an example implementation of the processes of FIGS. 13-14, respectively, in accordance with another aspect of the disclosure.

FIG. 16 illustrates an example implementation 1600 of the processes 1300-1400 of FIGS. 13-14, respectively, in accordance with an aspect of the disclosure. Referring to FIG. 16, the UL or Uu connections from the selected UE(s) over with the UL SRS-Ps are communicated to reach of TRPs 1, 2, 3 and 4 are indicated. As shown in FIG. 16, the pool of UEs is made up of UEs 1-8, and only UEs 1, 5 and 6 are designated for UL SRS-P transmission. As noted above, less than all of the UEs in the pool of UEs may be designated for UL SRS-P transmission to reduce SRS pollution, and so on. In some designs, at least one UE per clique may be selected for UL SRS-P transmission.

Referring to FIGS. 15-16, the first clique (or UEs 1-4) know their pairwise distances, and the second clique (or UEs 5-8) also know their pairwise distances. UE 1 also knows the range to UE 5. With this information, the network can configure the UEs in the pool of UEs with various options, such as:

Option 1: UE 1, UE 2, UE 3 transmit UL SRS-P. Knowing the location of these UEs may be used to infer the knowledge of UE 4 position (e.g., from the relative SL SRS-P ranging). UEs 5, 6 and 7 transmit UL SRS-P. Their locations infer the location of UE 8 (e.g., from the relative SL SRS-P ranging). The knowledge of the range UE 1-to-UE 5 can serve as a cross validation for the location estimates or can serve as an extra constraint in the positioning problem formulation. In this option, there are six (6) UL SRS-P transmissions.

Option 2: The network may leverage channel correlation to reduce UL SRS-P transmissions. For example, the distance from UE1 to UE5 can be considered small enough for significant differences to be noticed with respect to the operating accuracy requirements, and the network can use one UL SRS-P transmission from UE1, which would also serve as a 'proxy' for the UL SRS-P signal from UE 5.

Referring to FIGS. 15-16, in some designs, if there is a clique of N>3 nodes (e.g., all pairwise range distances are available per clique), the location of all the nodes in a respective clique can be inferred from the position of only 3 nodes (in 2D positioning).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a position estimation entity, comprising: identifying a pool of user equipments (UEs) for a sidelink (SL)-assisted position estimation procedure of a set of target UEs; determining a first resource configuration for the SL-assisted position estimation procedure, the first resource configuration including a first set of resources associated with communication of at least one SL sounding reference signal for positioning (SRS-P) between some or all of the pool of UEs; determining a second resource configuration for the SL-assisted position estimation procedure, the second resource configuration including a second set of resources associated with transmission of uplink (UL) SRS-P by at least one UE in the pool of UEs; transmitting a first indication of the first resource configuration to the pool of UEs; transmitting a second indication of the second resource configuration to the at least one UE;

receiving first measurement information based on measurements of the at least one SL SRS-P in accordance with the first resource configuration; receiving second measurement information based on measurements of the at least one UL SRS-P in accordance with the second resource configuration; and determining a position estimate for each UE in the set of UEs based on the first measurement information and the second measurement information.

Clause 2. The method of clause 1, wherein each UE in the pool of UEs has an established SL connection to each other UE in the pool of UEs with which a respective SL SRS-P is to be communicated in accordance with the first resource configuration prior to the transmission of the first indication.

Clause 3. The method of any of clauses 1 to 2, wherein one or more SL connections between UEs in the pool of UEs are setup in conjunction with the SL-assisted position estimation procedure.

Clause 4. The method of any of clauses 1 to 3, wherein the first set of resources precedes the second set of resources such that the at least one SL SRS-P is communicated before transmission of the at least one UL SRS-P.

Clause 5. The method of clause 4, further comprising: selecting the at least one UE in the pool of UEs for transmission of the at least one UL SRS-P based in part upon the first measurement information.

Clause 6. The method of clause 5, wherein the selection is based upon an overhead parameter, an accuracy parameter, a UE capability parameter, a power parameter, a quality parameter, a geographic parameter, or a combination thereof.

Clause 7. The method of any of clauses 1 to 6, wherein the second set of resources precedes the first set of resources such that the at least one transmission of the UL SRS-P occurs before the at least one SL SRS-P is communicated.

Clause 8. The method of any of clauses 1 to 7, further comprising: determining to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

Clause 9. The method of any of clauses 1 to 8, further comprising: transmitting indications of the determined position estimates.

Clause 10. The method of clause 9, wherein the indications of the determined position estimates are transmitted individually to each of the set of target UEs, or wherein at least one of the indications of the determined position estimates is transmitted to a lead UE for forwarding to a respective target UE.

Clause 11. The method of any of clauses 1 to 10, wherein one or more UEs in the pool of UEs is not part of the set of target UEs.

Clause 12. The method of clause 11, wherein the one or more UEs correspond to anchor UEs associated with one or more known position estimates.

Clause 13. The method of any of clauses 1 to 12, wherein the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

Clause 14. The method of any of clauses 1 to 13, wherein the position estimation entity corresponds to a UE among the pool of UEs or a network component.

Clause 15. The method of any of clauses 1 to 14, wherein the first measurement data is received via individual reports from a plurality of UEs in the pool of UEs that measure the at least one SL SRS-P, or wherein some or all of the first measurement data as measured by the plurality of UEs is received via a lead UE of the pool of UEs.

Clause 16. A method of operating a user equipment (UE), comprising: receiving a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; receiving a second indication of a second resource configuration for the SL-assisted position estimation procedure, the second resource configuration including a second set of resources associated with transmission of uplink (UL) SRS-P by the UE; transmitting a first SL SRS-P to one or more other UEs in the pool of UEs, measuring a second SL SRS-P from another UE in the pool of UEs, or both, in accordance with the first resource configuration; and transmitting the UL SRS-P in accordance with the second resource configuration.

Clause 17. The method of clause 16, wherein the UE is among the set of target UEs, further comprising: receiving a position estimate of the UE associated with the SL-assisted position estimation procedure.

Clause 18. The method of clause 17, wherein the position estimate is received from a position estimation entity or from another UE among the pool of UEs.

Clause 19. The method of any of clauses 16 to 18, wherein the UE has an established SL connection to each of the one or more other UEs in the pool of UEs prior to the reception of the first indication.

Clause 20. The method of any of clauses 16 to 19, wherein one or more SL connections between the UE and the one or more other UEs in the pool of UEs are setup in conjunction with the SL-assisted position estimation procedure.

Clause 21. The method of any of clauses 16 to 20, wherein the first set of resources precedes the second set of resources such that the at least one SL SRS-P is communicated before the transmission of the UL SRS-P.

Clause 22. The method of any of clauses 16 to 21, wherein the second set of resources precedes the first set of resources such that the transmission of the UL SRS-P occurs before the at least one SL SRS-P is communicated.

Clause 23. The method of any of clauses 16 to 22, wherein the UE in the pool of UEs is not part of the set of target UEs.

Clause 24. The method of clause 23, wherein the UE corresponds to an anchor UEs associated with a known position estimate.

Clause 25. The method of any of clauses 16 to 24, wherein the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

Clause 26. The method of any of clauses 16 to 25, wherein the UE measures the second SL SRS-P from the another UE, further comprising: transmitting measurement data based on the measurement of the second SL SRS-P directly to a position estimation entity or to a lead UE of the pool of UEs.

Clause 27. A position estimation entity, comprising: a memory; at least one transceiver; and at least one processor communicatively coupled to the memory and the at least one transceiver, the at least one processor configured to: identify a pool of user equipments (UEs) for a sidelink (SL)-assisted position estimation procedure of a set of target UEs; determine a first resource configuration for the SL-assisted position estimation procedure, the first resource configuration including a first set of resources associated with communication of at least one SL sounding reference signal for positioning (SRS-P) between some or all of the pool of UEs; determine a second resource configuration for the SL-assisted position estimation procedure, the second resource configuration including a second set of resources associated with transmission of uplink (UL) SRS-P by at least one UE in the pool of UEs; transmit, via the at least one transceiver, a first indication of the first resource configuration to the pool of UEs; transmit, via the at least one transceiver, a second indication of the second resource configuration to the at least one UE; receive, via the at least one transceiver, first measurement information based on measurements of the at least one SL SRS-P in accordance with the first resource configuration; receive, via the at least one transceiver, second measurement information based on measurements of the at least one UL SRS-P in accordance with the second resource configuration; and determine a position estimate for each UE in the set of UEs based on the first measurement information and the second measurement information.

Clause 28. The position estimation entity of clause 27, wherein each UE in the pool of UEs has an established SL connection to each other UE in the pool of UEs with which a respective SL SRS-P is to be communicated in accordance with the first resource configuration prior to the transmission of the first indication.

Clause 29. The position estimation entity of any of clauses 27 to 28, wherein one or more SL connections between UEs in the pool of UEs are setup in conjunction with the SL-assisted position estimation procedure.

Clause 30. The position estimation entity of any of clauses 27 to 29, wherein the first set of resources precedes the second set of resources such that the at least one SL SRS-P is communicated before transmission of the at least one UL SRS-P.

Clause 31. The position estimation entity of clause 30, wherein the at least one processor is further configured to: select the at least one UE in the pool of UEs for transmission of the at least one UL SRS-P based in part upon the first measurement information.

Clause 32. The position estimation entity of clause 31, wherein the selection is based upon an overhead parameter, an accuracy parameter, a UE capability parameter, a power parameter, a quality parameter, a geographic parameter, or a combination thereof.

Clause 33. The position estimation entity of any of clauses 27 to 32, wherein the second set of resources precedes the first set of resources such that the at least one transmission of the UL SRS-P occurs before the at least one SL SRS-P is communicated.

Clause 34. The position estimation entity of any of clauses 27 to 33, wherein the at least one processor is further configured to: determine to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

Clause 35. The position estimation entity of any of clauses 27 to 34, wherein the at least one processor is further configured to: transmit, via the at least one transceiver, indications of the determined position estimates.

Clause 36. The position estimation entity of clause 35, wherein the indications of the determined position estimates are transmitted individually to each of the set of target UEs, or wherein at least one of the indications of the determined position estimates is transmitted to a lead UE for forwarding to a respective target UE.

Clause 37. The position estimation entity of any of clauses 27 to 36, wherein one or more UEs in the pool of UEs is not part of the set of target UEs.

Clause 38. The position estimation entity of clause 37, wherein the one or more UEs correspond to anchor UEs associated with one or more known position estimates.

Clause 39. The position estimation entity of any of clauses 27 to 38, wherein the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

Clause 40. The position estimation entity of any of clauses 27 to 39, wherein the position estimation entity corresponds to a UE among the pool of UEs or a network component.

Clause 41. The position estimation entity of any of clauses 27 to 40, wherein the first measurement data is received via individual reports from a plurality of UEs in the pool of UEs that measure the at least one SL SRS-P, or wherein some or all of the first measurement data as measured by the plurality of UEs is received via a lead UE of the pool of UEs.

Clause 42. A user equipment (UE), comprising: a memory; at least one transceiver; and at least one processor communicatively coupled to the memory and the at least one transceiver, the at least one processor configured to: receive, via the at least one transceiver, a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; receive, via the at least one transceiver, a second indication of a second resource configuration for the SL-assisted position estimation procedure, the second resource configuration including a second set of resources associated with transmission of uplink (UL) SRS-P by the UE; transmit, via the at least one transceiver, a first SL SRS-P to one or more other UEs in the pool of UEs, measuring a second SL SRS-P from another UE in the pool of UEs, or both, in accordance with the first resource configuration; and transmit, via the at least one transceiver, the UL SRS-P in accordance with the second resource configuration.

Clause 43. The UE of clause 42, wherein the UE is among the set of target UEs, further comprising: wherein the at least one processor is further configured to receive, via the at least one transceiver, a position estimate of the UE associated with the SL-assisted position estimation procedure.

Clause 44. The UE of clause 43, wherein the position estimate is received from a position estimation entity or from another UE among the pool of UEs.

Clause 45. The UE of any of clauses 42 to 44, wherein the UE has an established SL connection to each of the one or more other UEs in the pool of UEs prior to the reception of the first indication.

Clause 46. The UE of any of clauses 42 to 45, wherein one or more SL connections between the UE and the one or more other UEs in the pool of UEs are setup in conjunction with the SL-assisted position estimation procedure.

Clause 47. The UE of any of clauses 42 to 46, wherein the first set of resources precedes the second set of resources such that the at least one SL SRS-P is communicated before the transmission of the UL SRS-P.

Clause 48. The UE of any of clauses 42 to 47, wherein the second set of resources precedes the first set of resources such that the transmission of the UL SRS-P occurs before the at least one SL SRS-P is communicated.

Clause 49. The UE of any of clauses 42 to 48, wherein the UE in the pool of UEs is not part of the set of target UEs.

Clause 50. The UE of clause 49, wherein the UE corresponds to an anchor UEs associated with a known position estimate.

Clause 51. The UE of any of clauses 42 to 50, wherein the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

Clause 52. The UE of any of clauses 42 to 51, wherein the UE measures the second SL SRS-P from the another UE, and wherein the at least one processor is further configured to transmit, via the at least one transceiver, measurement data based on the measurement of the second SL SRS-P directly to a position estimation entity or to a lead UE of the pool of UEs.

Clause 53. A position estimation entity, comprising: means for identifying a pool of user equipments (UEs) for a sidelink (SL)-assisted position estimation procedure of a set of target UEs; means for determining a first resource configuration for the SL-assisted position estimation procedure, the first resource configuration including a first set of resources associated with communication of at least one SL sounding reference signal for positioning (SRS-P) between some or all of the pool of UEs; means for determining a second resource configuration for the SL-assisted position estimation procedure, the second resource configuration including a second set of resources associated with transmission of uplink (UL) SRS-P by at least one UE in the pool of UEs; means for transmitting a first indication of the first resource configuration to the pool of UEs; means for transmitting a second indication of the second resource configuration to the at least one UE; means for receiving first measurement information based on measurements of the at least one SL SRS-P in accordance with the first resource configuration; means for receiving second measurement information based on measurements of the at least one UL SRS-P in accordance with the second resource configuration; and means for determining a position estimate for each UE in the set of UEs based on the first measurement information and the second measurement information.

Clause 54. The position estimation entity of clause 53, wherein each UE in the pool of UEs has an established SL connection to each other UE in the pool of UEs with which a respective SL SRS-P is to be communicated in accordance with the first resource configuration prior to the transmission of the first indication.

Clause 55. The position estimation entity of any of clauses 53 to 54, wherein one or more SL connections between UEs in the pool of UEs are setup in conjunction with the SL-assisted position estimation procedure.

Clause 56. The position estimation entity of any of clauses 53 to 55, wherein the first set of resources precedes the second set of resources such that the at least one SL SRS-P is communicated before transmission of the at least one UL SRS-P.

Clause 57. The position estimation entity of clause 56, further comprising: means for selecting the at least one UE in the pool of UEs for transmission of the at least one UL SRS-P based in part upon the first measurement information.

Clause 58. The position estimation entity of clause 57, wherein the selection is based upon an overhead parameter, an accuracy parameter, a UE capability parameter, a power parameter, a quality parameter, a geographic parameter, or a combination thereof.

Clause 59. The position estimation entity of any of clauses 53 to 58, wherein the second set of resources precedes the first set of resources such that the at least one transmission of the UL SRS-P occurs before the at least one SL SRS-P is communicated.

Clause 60. The position estimation entity of any of clauses 53 to 59, further comprising: means for determining to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

Clause 61. The position estimation entity of any of clauses 53 to 60, further comprising: means for transmitting indications of the determined position estimates.

Clause 62. The position estimation entity of clause 61, wherein the indications of the determined position estimates are transmitted individually to each of the set of target UEs, or wherein at least one of the indications of the determined position estimates is transmitted to a lead UE for forwarding to a respective target UE.

Clause 63. The position estimation entity of any of clauses 53 to 62, wherein one or more UEs in the pool of UEs is not part of the set of target UEs.

Clause 64. The position estimation entity of clause 63, wherein the one or more UEs correspond to anchor UEs associated with one or more known position estimates.

Clause 65. The position estimation entity of any of clauses 53 to 64, wherein the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

Clause 66. The position estimation entity of any of clauses 53 to 65, wherein the position estimation entity corresponds to a UE among the pool of UEs or a network component.

Clause 67. The position estimation entity of any of clauses 53 to 66, wherein the first measurement data is received via individual reports from a plurality of UEs in the pool of UEs that measure the at least one SL SRS-P, or wherein some or all of the first measurement data as measured by the plurality of UEs is received via a lead UE of the pool of UEs.

Clause 68. A user equipment (UE), comprising: means for receiving a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; means for receiving a second indication of a second resource configuration for the SL-assisted position estimation procedure, the second resource configuration including a second set of resources associated with transmission of uplink (UL) SRS-P by the UE; means for transmitting a first SL SRS-P to one or more other UEs in the pool of UEs, measuring a second SL SRS-P from another UE in the pool of UEs, or both, in accordance with the first resource configuration; and means for transmitting the UL SRS-P in accordance with the second resource configuration.

Clause 69. The UE of clause 68, wherein the UE is among the set of target UEs, further comprising: means for receiving a position estimate of the UE associated with the SL-assisted position estimation procedure.

Clause 70. The UE of clause 69, wherein the position estimate is received from a position estimation entity or from another UE among the pool of UEs.

Clause 71. The UE of any of clauses 68 to 70, wherein the UE has an established SL connection to each of the one or more other UEs in the pool of UEs prior to the reception of the first indication.

Clause 72. The UE of any of clauses 68 to 71, wherein one or more SL connections between the UE and the one or more other UEs in the pool of UEs are setup in conjunction with the SL-assisted position estimation procedure.

Clause 73. The UE of any of clauses 68 to 72, wherein the first set of resources precedes the second set of resources such that the at least one SL SRS-P is communicated before the transmission of the UL SRS-P.

Clause 74. The UE of any of clauses 68 to 73, wherein the second set of resources precedes the first set of resources such that the transmission of the UL SRS-P occurs before the at least one SL SRS-P is communicated.

Clause 75. The UE of any of clauses 68 to 74, wherein the UE in the pool of UEs is not part of the set of target UEs.

Clause 76. The UE of clause 75, wherein the UE corresponds to an anchor UEs associated with a known position estimate.

Clause 77. The UE of any of clauses 68 to 76, wherein the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

Clause 78. The UE of any of clauses 68 to 77, wherein the UE measures the second SL SRS-P from the another UE, further comprising: means for transmitting measurement data based on the measurement of the second SL SRS-P directly to a position estimation entity or to a lead UE of the pool of UEs.

Clause 79. A non-transitory computer-readable medium storing computer-executable instructions that, when executed by a position estimation entity, cause the position estimation entity to: identify a pool of user equipments (UEs) for a sidelink (SL)-assisted position estimation procedure of a set of target UEs; determine a first resource configuration for the SL-assisted position estimation procedure, the first resource configuration including a first set of resources associated with communication of at least one SL sounding reference signal for positioning (SRS-P) between some or all of the pool of UEs; determine a second resource configuration for the SL-assisted position estimation procedure, the second resource configuration including a second set of resources associated with transmission of uplink (UL) SRS-P by at least one UE in the pool of UEs; transmit a first indication of the first resource configuration to the pool of UEs; transmit a second indication of the second resource configuration to the at least one UE; receive first measurement information based on measurements of the at least one SL SRS-P in accordance with the first resource configuration; receive second measurement information based on measurements of the at least one UL SRS-P in accordance with the second resource configuration; and determine a position estimate for each UE in the set of UEs based on the first measurement information and the second measurement information.

Clause 80. The non-transitory computer-readable medium of clause 79, wherein each UE in the pool of UEs has an established SL connection to each other UE in the pool of UEs with which a respective SL SRS-P is to be communicated in accordance with the first resource configuration prior to the transmission of the first indication.

Clause 81. The non-transitory computer-readable medium of any of clauses 79 to 80, wherein one or more SL connections between UEs in the pool of UEs are setup in conjunction with the SL-assisted position estimation procedure.

Clause 82. The non-transitory computer-readable medium of any of clauses 79 to 81, wherein the first set of resources precedes the second set of resources such that the at least one SL SRS-P is communicated before transmission of the at least one UL SRS-P.

Clause 83. The non-transitory computer-readable medium of clause 82, further comprising instructions that, when executed by position estimation entity, further cause the position estimation entity to: select the at least one UE in the pool of UEs for transmission of the at least one UL SRS-P based in part upon the first measurement information.

Clause 84. The non-transitory computer-readable medium of clause 83, wherein the selection is based upon an overhead parameter, an accuracy parameter, a UE capability parameter, a power parameter, a quality parameter, a geographic parameter, or a combination thereof.

Clause 85. The non-transitory computer-readable medium of any of clauses 79 to 84, wherein the second set of resources precedes the first set of resources such that the at least one transmission of the UL SRS-P occurs before the at least one SL SRS-P is communicated.

Clause 86. The non-transitory computer-readable medium of any of clauses 79 to 85, further comprising instructions that, when executed by position estimation entity, further cause the position estimation entity to: determine to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

Clause 87. The non-transitory computer-readable medium of any of clauses 79 to 86, further comprising instructions that, when executed by position estimation entity, further cause the position estimation entity to: transmit indications of the determined position estimates.

Clause 88. The non-transitory computer-readable medium of clause 87, wherein the indications of the determined position estimates are transmitted individually to each of the set of target UEs, or wherein at least one of the indications of the determined position estimates is transmitted to a lead UE for forwarding to a respective target UE.

Clause 89. The non-transitory computer-readable medium of any of clauses 79 to 88, wherein one or more UEs in the pool of UEs is not part of the set of target UEs.

Clause 90. The non-transitory computer-readable medium of clause 89, wherein the one or more UEs correspond to anchor UEs associated with one or more known position estimates.

Clause 91. The non-transitory computer-readable medium of any of clauses 79 to 90, wherein the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

Clause 92. The non-transitory computer-readable medium of any of clauses 79 to 91, wherein the position estimation entity corresponds to a UE among the pool of UEs or a network component.

Clause 93. The non-transitory computer-readable medium of any of clauses 79 to 92, wherein the first measurement data is received via individual reports from a plurality of UEs in the pool of UEs that measure the at least one SL SRS-P, or wherein some or all of the first measurement data as measured by the plurality of UEs is received via a lead UE of the pool of UEs.

Clause 94. A non-transitory computer-readable medium storing computer-executable instructions that, when executed by a user equipment (UE), cause the UE to: receive a first indication of a first resource configuration for a sidelink (SL)-assisted position estimation procedure of a set of target UEs, the first resource configuration including a first set of resources associated with communication of at least one SL sounding reference signal for positioning (SRS-P) between some or all of a pool of UEs; receive a second indication of a second resource configuration for the SL-assisted position estimation procedure, the second resource configuration including a second set of resources associated with transmission of uplink (UL) SRS-P by the UE; transmit a first SL SRS-P to one or more other UEs in the pool of UEs, measuring a second SL SRS-P from another UE in the pool of UEs, or both, in accordance with the first resource configuration; and transmit the UL SRS-P in accordance with the second resource configuration.

Clause 95. The non-transitory computer-readable medium of clause 94, wherein the UE is among the set of target UEs, wherein the instructions further cause the UE to receive a position estimate of the UE associated with the SL-assisted position estimation procedure.

Clause 96. The non-transitory computer-readable medium of clause 95, wherein the position estimate is received from a position estimation entity or from another UE among the pool of UEs.

Clause 97. The non-transitory computer-readable medium of any of clauses 94 to 96, wherein the UE has an established SL connection to each of the one or more other UEs in the pool of UEs prior to the reception of the first indication.

Clause 98. The non-transitory computer-readable medium of any of clauses 94 to 97, wherein one or more SL connections between the UE and the one or more other UEs in the pool of UEs are setup in conjunction with the SL-assisted position estimation procedure.

Clause 99. The non-transitory computer-readable medium of any of clauses 94 to 98, wherein the first set of resources precedes the second set of resources such that the at least one SL SRS-P is communicated before the transmission of the UL SRS-P.

Clause 100. The non-transitory computer-readable medium of any of clauses 94 to 99, wherein the second set of resources precedes the first set of resources such that the transmission of the UL SRS-P occurs before the at least one SL SRS-P is communicated.

Clause 101. The non-transitory computer-readable medium of any of clauses 94 to 100, wherein the UE in the pool of UEs is not part of the set of target UEs.

Clause 102. The non-transitory computer-readable medium of clause 101, wherein the UE corresponds to an anchor UEs associated with a known position estimate.

Clause 103. The non-transitory computer-readable medium of any of clauses 94 to 102, wherein the UE and the one or more other UEs form a subset of UEs within the pool of UEs, wherein each UE in the subset of UEs has an established SL connection to each other UE in the same subset of UEs, and wherein at least one UE in the subset of UEs has an established SL connection to at least one other UE in at least one other subset of UEs.

Clause 104. The non-transitory computer-readable medium of any of clauses 94 to 103, wherein the UE measures the second SL SRS-P from the another UE, further comprising: wherein the instructions further cause the UE to transmit measurement data based on the measurement of the second SL SRS-P directly to a position estimation entity or to a lead UE of the pool of UEs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a position estimation entity, comprising:
    identifying a pool of user equipments (UEs) for a sidelink (SL)-assisted position estimation procedure of a set of target UEs;
    determining a first resource configuration for the SL-assisted position estimation procedure, the first resource configuration including a first set of resources associated with communication of at least one SL sounding reference signal for positioning (SRS-P) between some or all of the pool of UEs;
    determining a second resource configuration for the SL-assisted position estimation procedure, the second resource configuration including a second set of resources associated with transmission of uplink (UL) SRS-P by at least one UE in the pool of UEs;
    wherein the first set of resources precedes the second set of resources such that the at least one SL SRS-P is communicated before transmission of the at least one UL SRS-P;
    transmitting a first indication of the first resource configuration to the pool of UEs;
    transmitting a second indication of the second resource configuration to the at least one UE;
    receiving first measurement information based on measurements of the at least one SL SRS-P in accordance with the first resource configuration;
    receiving second measurement information based on measurements of the at least one UL SRS-P in accordance with the second resource configuration; and
    determining a position estimate for each UE in the set of UEs based on the first measurement information and the second measurement information.

2. The method of claim 1, wherein each UE in the pool of UEs has an established SL connection to each other UE in the pool of UEs with which a respective SL SRS-P is to be communicated in accordance with the first resource configuration prior to the transmission of the first indication.

3. The method of claim 1, wherein one or more SL connections between UEs in the pool of UEs are setup in conjunction with the SL-assisted position estimation procedure.

4. The method of claim 1, further comprising:
    selecting the at least one UE in the pool of UEs for transmission of the at least one UL SRS-P based in part upon the first measurement information.

5. The method of claim 4, wherein the selection is based upon an overhead parameter, an accuracy parameter, a UE capability parameter, a power parameter, a quality parameter, a geographic parameter, or a combination thereof.

6. A method of operating a position estimation entity, comprising:
    identifying a pool of user equipments (UEs) for a sidelink (SL)-assisted position estimation procedure of a set of target UEs;
    determining a first resource configuration for the SL-assisted position estimation procedure, the first resource configuration including a first set of resources associated with communication of at least one SL sounding reference signal for positioning (SRS-P) between some or all of the pool of UEs;
    determining a second resource configuration for the SL-assisted position estimation procedure, the second resource configuration including a second set of resources associated with transmission of uplink (UL) SRS-P by at least one UE in the pool of UEs;
    wherein the second set of resources precedes the first set of resources such that the at least one transmission of the UL SRS-P occurs before the at least one SL SRS-P is communicated;
    transmitting a first indication of the first resource configuration to the pool of UEs;
    transmitting a second indication of the second resource configuration to the at least one UE;
    receiving first measurement information based on measurements of the at least one SL SRS-P in accordance with the first resource configuration;

receiving second measurement information based on measurements of the at least one UL SRS-P in accordance with the second resource configuration; and determining a position estimate for each UE in the set of UEs based on the first measurement information and the second measurement information.

7. The method of claim 1, further comprising:

determining to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

8. The method of claim 1, further comprising:

transmitting indications of the determined position estimates.

9. The method of claim 8, wherein the indications of the determined position estimates are transmitted individually to each of the set of target UEs, or wherein at least one of the indications of the determined position estimates is transmitted to a lead UE for forwarding to a respective target UE.

10. The method of claim 1, wherein one or more UEs in the pool of UEs is not part of the set of target UEs.

11. The method of claim 10, wherein the one or more UEs correspond to anchor UEs associated with one or more known position estimates.

12. The method of claim 1, wherein the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

13. The method of claim 1, wherein the position estimation entity corresponds to a UE among the pool of UEs or a network component.

14. The method of claim 1, wherein the first measurement data is received via individual reports from a plurality of UEs in the pool of UEs that measure the at least one SL SRS-P, or wherein some or all of the first measurement data as measured by the plurality of UEs is received via a lead UE of the pool of UEs.

15. A position estimation entity, comprising:

a memory;

at least one transceiver; and at least one processor communicatively coupled to the memory and the at least one transceiver, the at least one processor configured to:

identify a pool of user equipments (UEs) for a sidelink (SL)-assisted position estimation procedure of a set of target UEs;

determine a first resource configuration for the SL-assisted position estimation procedure, the first resource configuration including a first set of resources associated with communication of at least one SL sounding reference signal for positioning (SRS-P) between some or all of the pool of UEs;

determine a second resource configuration for the SL-assisted position estimation procedure, the second resource configuration including a second set of resources associated with transmission of uplink (UL) SRS-P by at least one UE in the pool of UEs;

wherein the first set of resources precedes the second set of resources such that the at least one SL SRS-P is communicated before transmission of the at least one UL SRS-P;

transmit, via the at least one transceiver, a first indication of the first resource configuration to the pool of UEs;

transmit, via the at least one transceiver, a second indication of the second resource configuration to the at least one UE;

receive, via the at least one transceiver, first measurement information based on measurements of the at least one SL SRS-P in accordance with the first resource configuration;

receive, via the at least one transceiver, second measurement information based on measurements of the at least one UL SRS-P in accordance with the second resource configuration; and determine a position estimate for each UE in the set of UEs based on the first measurement information and the second measurement information.

16. The position estimation entity of claim 15, wherein each UE in the pool of UEs has an established SL connection to each other UE in the pool of UEs with which a respective SL SRS-P is to be communicated in accordance with the first resource configuration prior to the transmission of the first indication.

17. The position estimation entity of claim 15, wherein one or more SL connections between UEs in the pool of UEs are setup in conjunction with the SL-assisted position estimation procedure.

18. The position estimation entity of claim 15, wherein the at least one processor is further configured to:

select the at least one UE in the pool of UEs for transmission of the at least one UL SRS-P based in part upon the first measurement information.

19. The position estimation entity of claim 18, wherein the selection is based upon an overhead parameter, an accuracy parameter, a UE capability parameter, a power parameter, a quality parameter, a geographic parameter, or a combination thereof.

20. A position estimation entity, comprising:

a memory;

at least one transceiver; and at least one processor communicatively coupled to the memory and the at least one transceiver, the at least one processor configured to:

identify a pool of user equipments (UEs) for a sidelink (SL)-assisted position estimation procedure of a set of target UEs;

determine a first resource configuration for the SL-assisted position estimation procedure, the first resource configuration including a first set of resources associated with communication of at least one SL sounding reference signal for positioning (SRS-P) between some or all of the pool of UEs;

determine a second resource configuration for the SL-assisted position estimation procedure, the second resource configuration including a second set of resources associated with transmission of uplink (UL) SRS-P by at least one UE in the pool of UEs;

wherein the second set of resources precedes the first set of resources such that the at least one transmission of the UL SRS-P occurs before the at least one SL SRS-P is communicated;

transmit, via the at least one transceiver, a first indication of the first resource configuration to the pool of UEs;

transmit, via the at least one transceiver, a second indication of the second resource configuration to the at least one UE;

receive, via the at least one transceiver, first measurement information based on measurements of the at least one SL SRS-P in accordance with the first resource configuration;

receive, via the at least one transceiver, second measurement information based on measurements of the at least one UL SRS-P in accordance with the second resource configuration; and determine a position estimate for each UE in the set of UEs based on the first measurement information and the second measurement information.

21. The position estimation entity of claim 15, wherein the at least one processor is further configured to:

determine to perform another SL-assisted position estimation procedure including some or all of the pool of UEs, wherein the at least one UE designated to transmit the at least one UL SRS-P is updated for the another SL-assisted position estimation procedure based on information obtained in association with the SL-assisted position estimation procedure.

22. The position estimation entity of claim 15, wherein the at least one processor is further configured to:

transmit, via the at least one transceiver, indications of the determined position estimates.

23. The position estimation entity of claim 22, wherein the indications of the determined position estimates are transmitted individually to each of the set of target UEs, or wherein at least one of the indications of the determined position estimates is transmitted to a lead UE for forwarding to a respective target UE.

24. The position estimation entity of claim 15, wherein one or more UEs in the pool of UEs is not part of the set of target UEs.

25. The position estimation entity of claim 24, wherein the one or more UEs correspond to anchor UEs associated with one or more known position estimates.

26. The position estimation entity of claim 15, wherein the pool of UEs includes two or more subsets of UEs, wherein each UE in a respective subset of UEs has an established SL connection to each other UE in the same subset of UEs, and wherein at least one UE in each respective subset of UEs has an established SL connection to at least one other UE in at least one other respective subset of UEs.

27. The position estimation entity of claim 15, wherein the position estimation entity corresponds to a UE among the pool of UEs or a network component.

28. The position estimation entity of claim 15, wherein the first measurement data is received via individual reports from a plurality of UEs in the pool of UEs that measure the at least one SL SRS-P, or wherein some or all of the first measurement data as measured by the plurality of UEs is received via a lead UE of the pool of UEs.

* * * * *